(12) United States Patent
Murakami et al.

(10) Patent No.: US 11,875,654 B2
(45) Date of Patent: Jan. 16, 2024

(54) CHECKOUT-PAYMENT DEVICE AND SYSTEM USING A CONFIRMATION WAITING TIME FOR CONFIRMATION OF AN ITEM RECOGNITION

(71) Applicant: PANASONIC INTELLECTUAL PROPERTY MANAGEMENT CO., LTD., Osaka (JP)

(72) Inventors: Nobuyoshi Murakami, Fukuoka (JP); Megumi Yamaoka, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/921,795

(22) PCT Filed: Apr. 1, 2021

(86) PCT No.: PCT/JP2021/014186
§ 371 (c)(1),
(2) Date: Oct. 27, 2022

(87) PCT Pub. No.: WO2021/220713
PCT Pub. Date: Nov. 4, 2021

(65) Prior Publication Data
US 2023/0169833 A1 Jun. 1, 2023

(30) Foreign Application Priority Data

Apr. 28, 2020 (JP) .................. 2020-079425

(51) Int. Cl.
G07G 1/00 (2006.01)
G06V 20/64 (2022.01)
(Continued)

(52) U.S. Cl.
CPC .......... *G07G 1/0036* (2013.01); *G06Q 20/20* (2013.01); *G06Q 20/206* (2013.01);
(Continued)

(58) Field of Classification Search
None
See application file for complete search history.

(56) References Cited

U.S. PATENT DOCUMENTS

2013/0101168 A1* 4/2013 Naito .................. G07G 1/0063
382/103
2014/0133704 A1* 5/2014 Iizaka .................. G06V 20/20
382/103
(Continued)

FOREIGN PATENT DOCUMENTS

JP 2013161423 A * 8/2013
JP 2016-173657 A 9/2016

OTHER PUBLICATIONS

Machine translation of JP 2013161423, retrieved from European Patent Office on Sep. 21, 2023 (Year: 2023).*
ISR for PCT/JP2021/014186, dated Jun. 8, 2021 (w/ translation).

*Primary Examiner* — Suezu Ellis
(74) *Attorney, Agent, or Firm* — Greenblum & Bernstein, P.L.C.

(57) ABSTRACT

A checkout-payment device includes a table on which an item can be placed; a touch screen display; a camera for shooting the item on the table; and a controller configured to perform an operation for recognizing the item based on an image captured by the camera, display an item recognition result on the touch screen display, and start a confirmation waiting time during which the controller continues the item recognition operation and the user can confirm the item
(Continued)

recognition result, followed by transitioning to a state in which the user's instructions for payment execution is acceptable.

7 Claims, 16 Drawing Sheets

(51) Int. Cl.
  *G06Q 20/40* (2012.01)
  *G07G 1/01* (2006.01)
  *G06Q 20/20* (2012.01)
  *G06V 40/16* (2022.01)

(52) U.S. Cl.
  CPC ....... *G06Q 20/40145* (2013.01); *G06V 20/64* (2022.01); *G06V 40/172* (2022.01); *G07G 1/0018* (2013.01); *G07G 1/01* (2013.01)

(56) References Cited

U.S. PATENT DOCUMENTS

| | | | |
|---|---|---|---|
| 2016/0275363 A1 | 9/2016 | Matsuzaki | |
| 2023/0169508 A1* | 6/2023 | Murakami | G07G 3/006 705/44 |

* cited by examiner

Fig.6
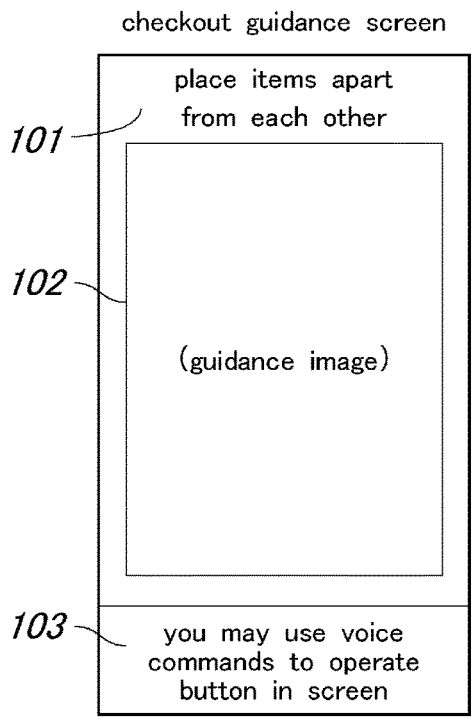
(A)
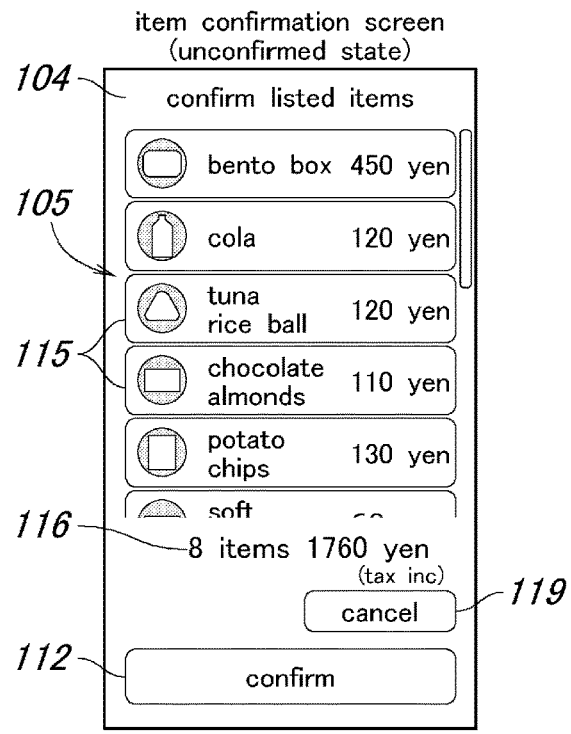
(B)
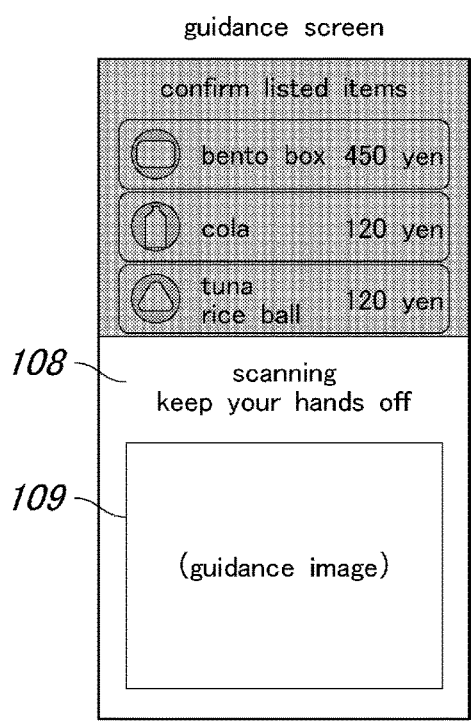
(C)
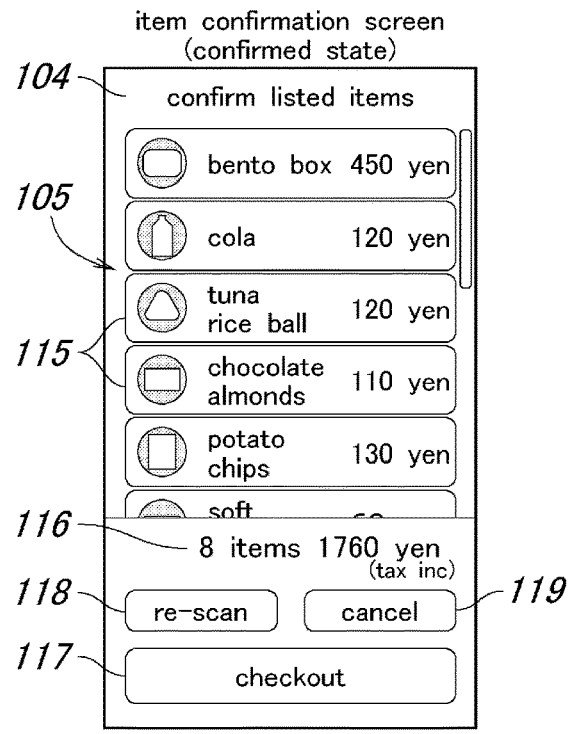
(D)

Fig.7
face recognition screen
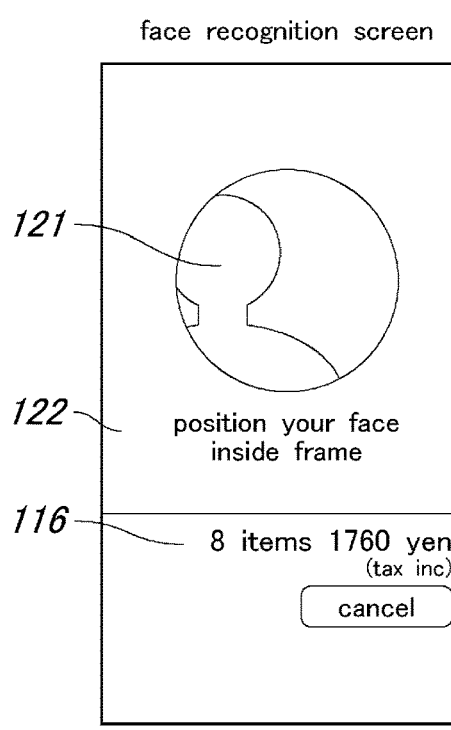
(A)
face recognition screen (scans being performed)
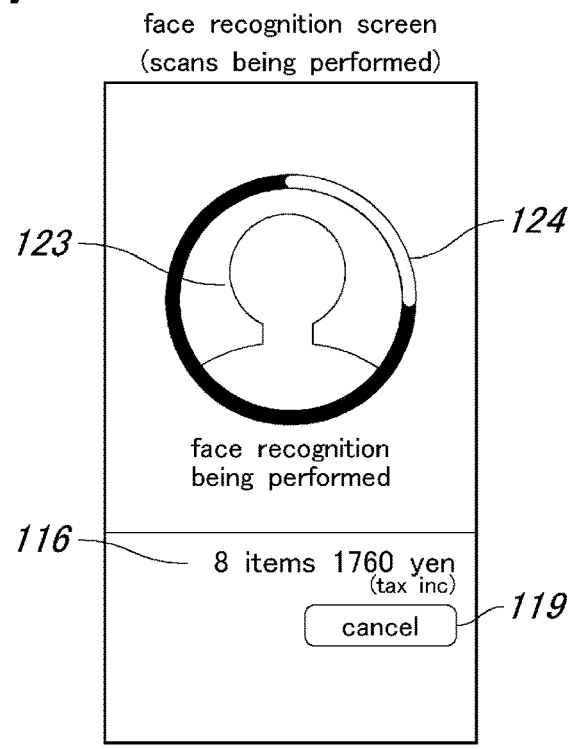
(B)
face recognition result confirmation screen
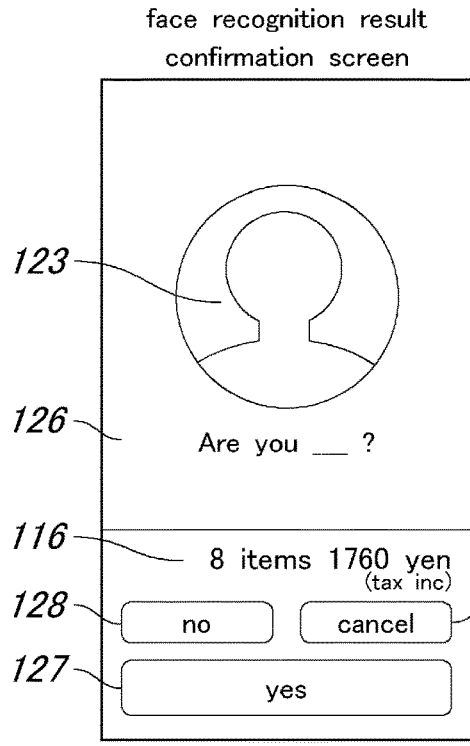
(C)
error screen
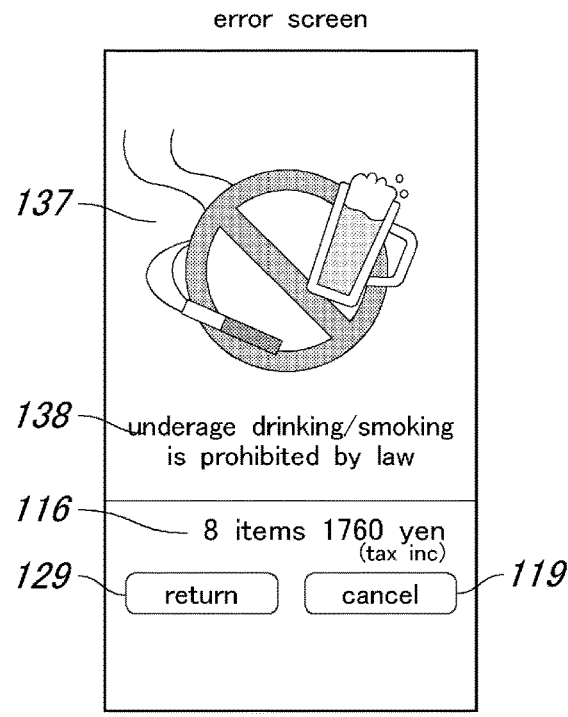
(D)

Fig.8
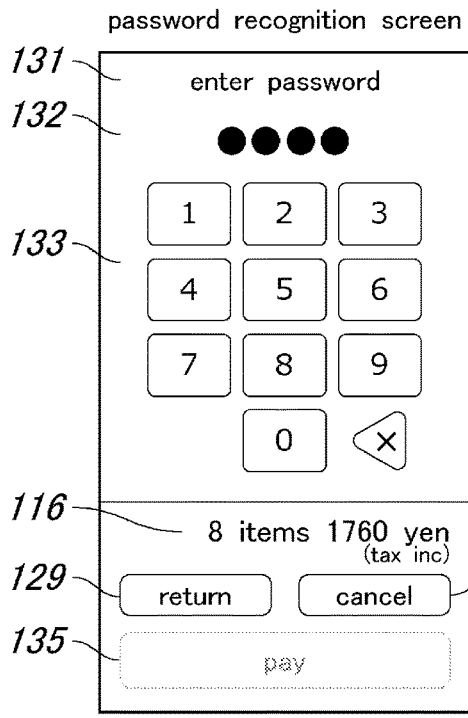
(A)
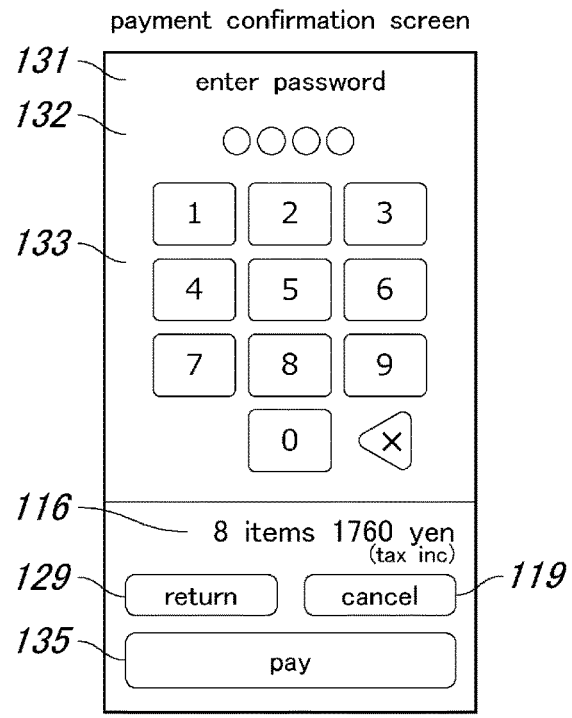
(B)
(C)
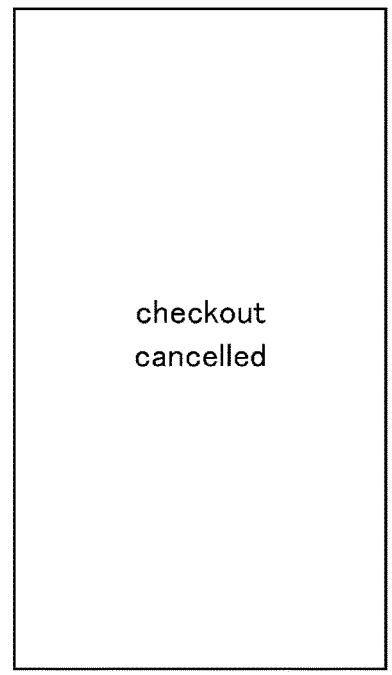
(D)

Fig.9
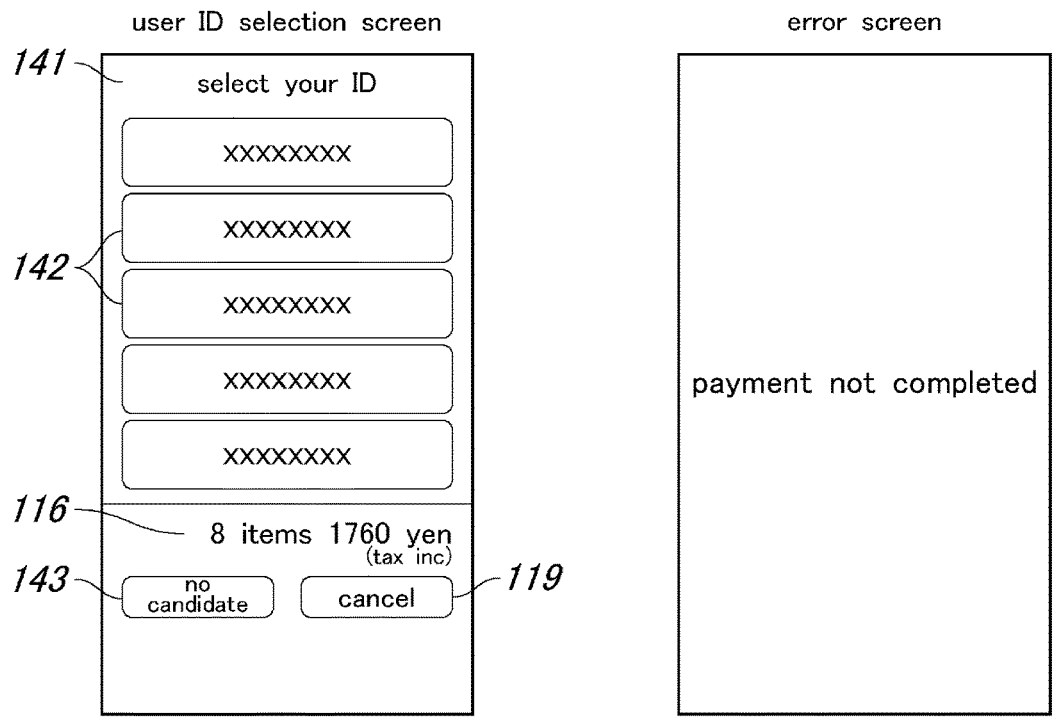
(A) (B)
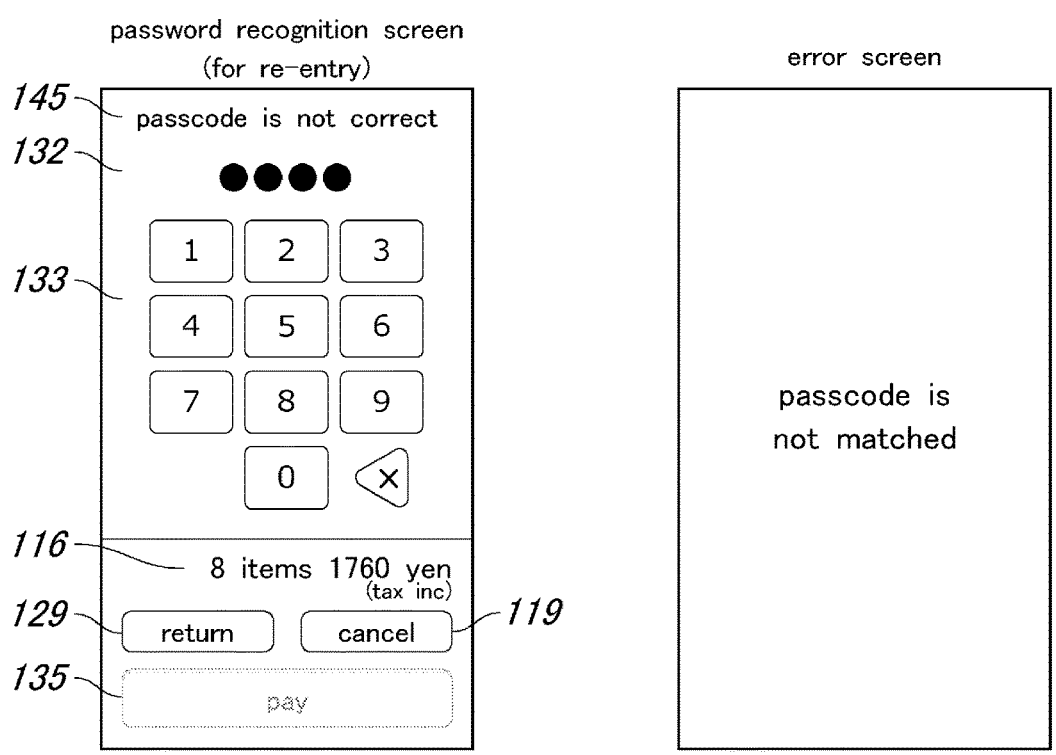
(C) (D)

Fig.10
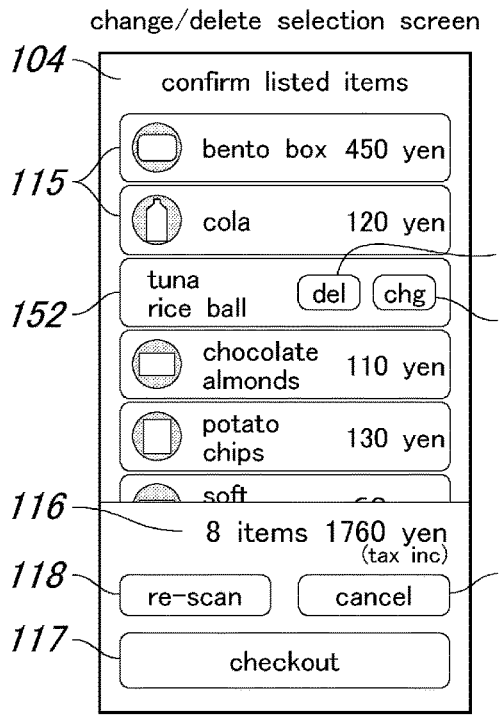
(A)
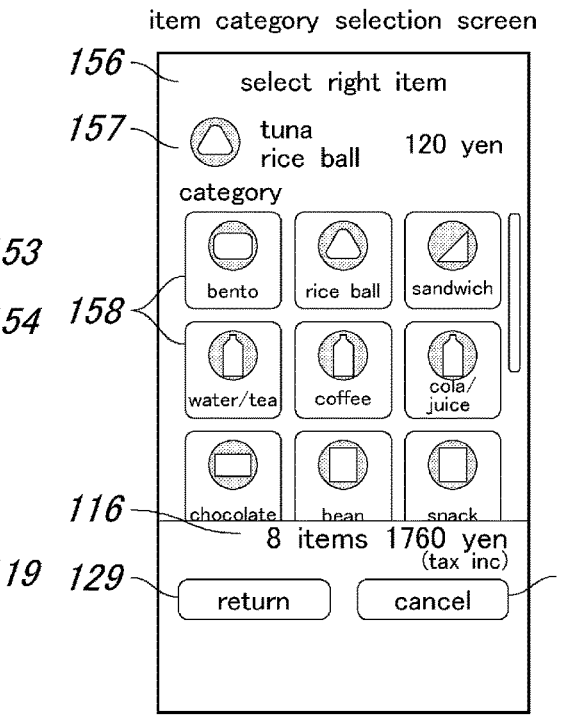
(B)
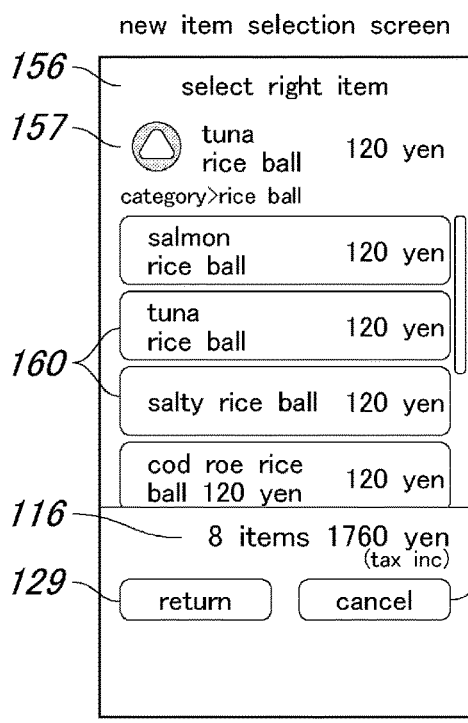
(C)
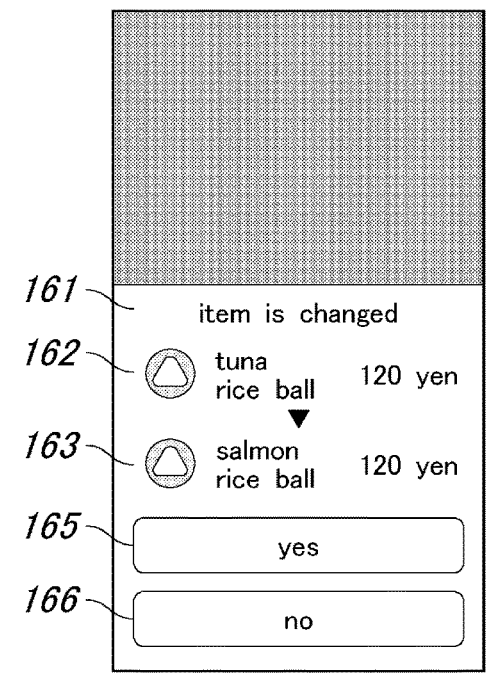
(D)

Fig.11
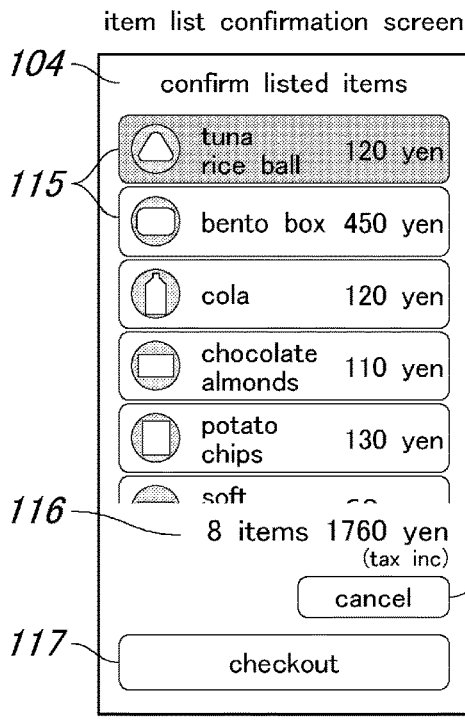
(A)
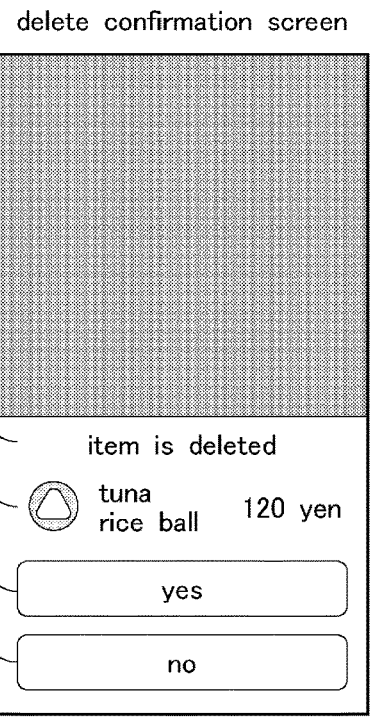
(B)
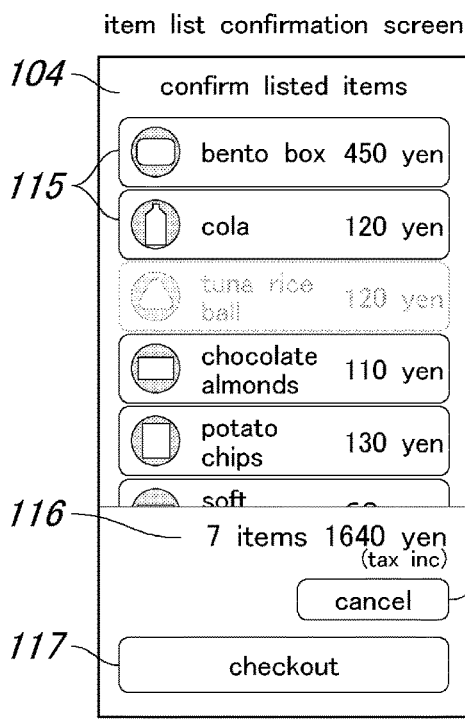
(C)
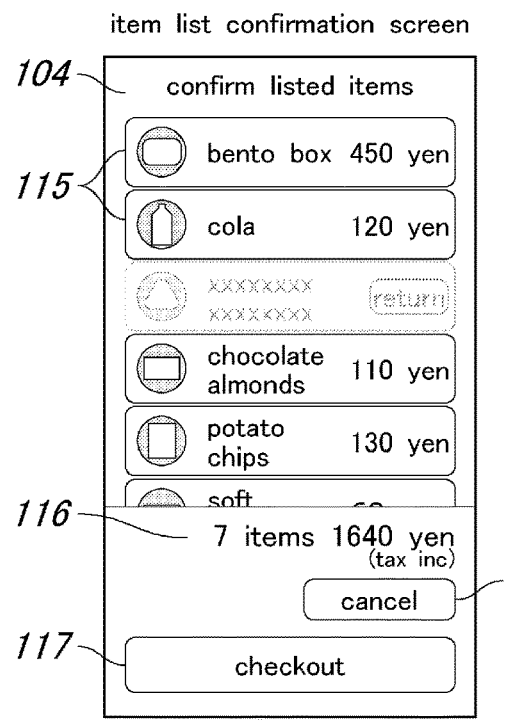
(D)

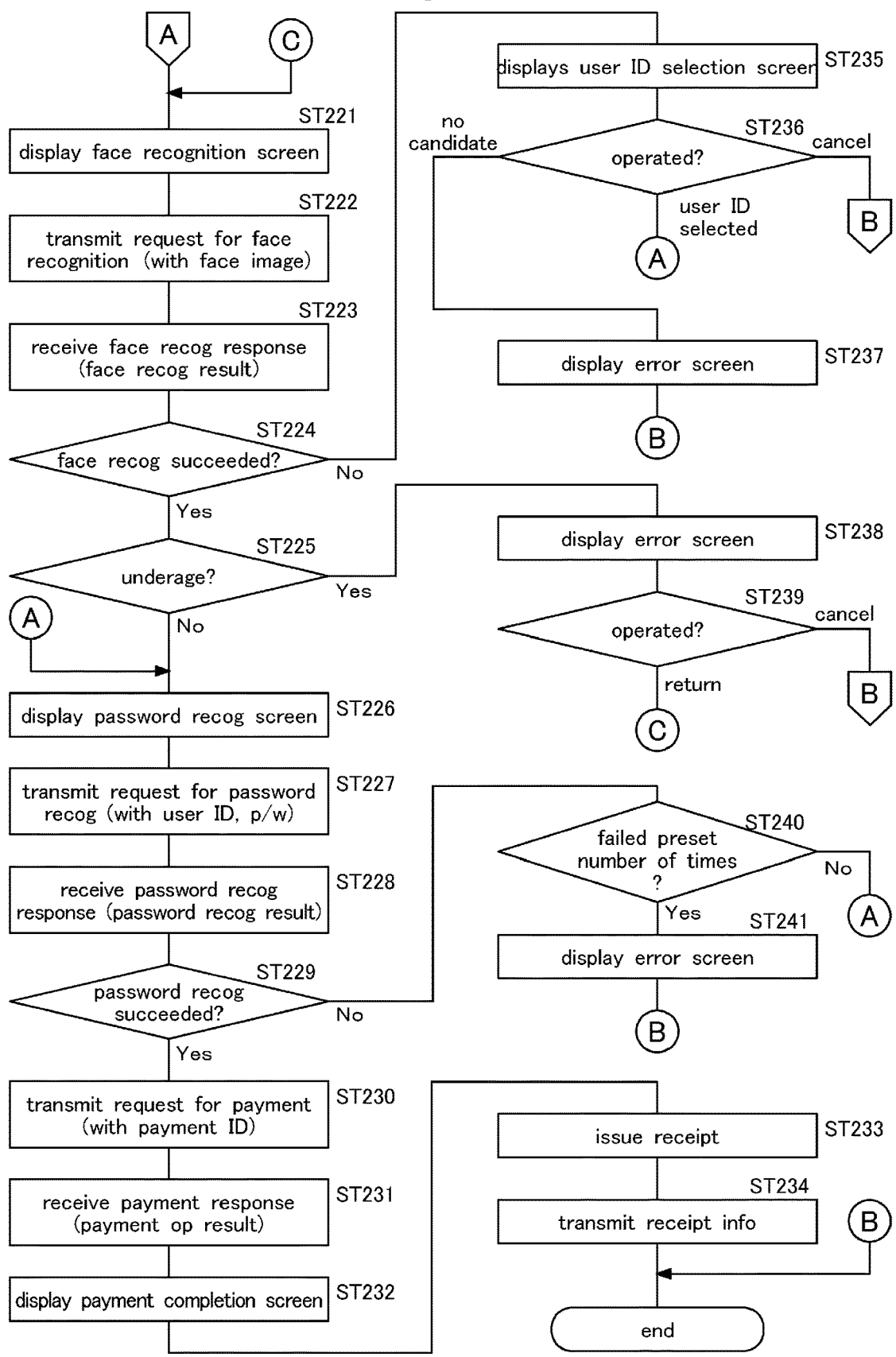

CHECKOUT-PAYMENT DEVICE AND SYSTEM USING A CONFIRMATION WAITING TIME FOR CONFIRMATION OF AN ITEM RECOGNITION

TECHNICAL FIELD

The present invention relates to a checkout-payment device and a checkout-payment system for recognizing a merchandise item chosen by a user from those in a selling space and making checkout and payment for the merchandise item.

BACKGROUND ART

In most retail stores such as convenience stores and supermarkets, when a customer purchases merchandise items (hereafter also referred to as simply "item(s)") at a checkout counter, a store clerk operates a POS terminal to enter information on the merchandise items brought by the customer. Then, after the POS terminal presents the total amount of payment for the items to the customer, the store clerk performs a payment (settlement) operation for accepting the customer's payment. In recent years, various techniques have been proposed for automating such operations of store clerks.

Known technologies for such automation of store clerks' operations include a device configured to recognize merchandise items to be purchased by a customer through object recognition (image recognition) technology, acquire and register information on the recognized items, and allow the customer to make a payment for the merchandise items (Patent Document 1). In this case, a store clerk only needs to perform some simple operations such as operation of a shooting button displayed on a touch screen display, which eliminate the need for store clerks to enter information on merchandise items to be purchased by the customer.

PRIOR ART DOCUMENT (S)

Patent Document(s)

Patent Document 1: JP2016-173657A

SUMMARY OF THE INVENTION

Task to be Accomplished by the Invention

In recent years, an increased number of retail stores such as convenience stores have introduced what is called self-checkout systems, which enable customers (shoppers) to check out merchandise items to purchase without store staff. The above-described device of the prior art is a checkout-payment device installed at manned checkout counter in a store. When this prior art technology for recognizing merchandise items to be purchased through object recognition is adopted into a self-checkout-payment device, it becomes possible to eliminate the need for customers to enter information on merchandise items to purchase, which improves customers' convenience.

Moreover, such self-checkout-payment devices are needed not only at retail stores such as convenience stores and supermarkets, but also at small stores (stands) located in facilities such as office buildings and stations. In the latter case, it is preferable that a self-checkout-payment device has a small footprint and can be easily installed at a small space such as a small stand. However, a checkout-payment device of the prior art, which generally includes a camera located above a shooting table and a touch screen display provided on a side of the shooting table, involves a problem that the size of an entire device becomes large and bulky, and the demand for space-saving designs has not been considered.

In the case of a checkout-payment device which is made small and space-saving, when a user operates a touch screen display with a hand, the user's hand becomes likely to enter a shooting area of a camera used for object recognition, thereby changing an image captured by the camera, which can cause the device to erroneously recognize or fail to recognize an item through object recognition. Furthermore, this interference with captured images by the user's hand can cause an unnatural (improper) change in an item recognition result shown in the touch screen display while the user operates the display, which makes the user feel uneasy about the device's operation; that is, feel that something is wrong with the device. For this reason, when a checkout-payment device is made small and space-saving, the device needs to be carefully designed so as not to cause interference with image recognition of merchandise items.

The present invention was made in view of such a problem of the prior art, and has a primary object to provide a checkout-payment device and a checkout-payment system configured to recognize an item to be purchased through object recognition and allow a user to operate a touch screen display for purchase of the item, which can be made space-saving and easily installed at a small store while being configured to avoid interference with object recognition.

Means to Accomplish the Task

An aspect of the present invention provides a checkout-payment device for recognizing a merchandise item chosen by a user from those in a selling space and making checkout and payment for the merchandise item, the device comprising: a table portion on which a user can place a merchandise item to purchase; a touch screen display arranged opposite to the user across the table portion therebetween; a camera device for capturing an image of a merchandise item on the table portion; and a controller configured to perform an item recognition operation for recognizing the merchandise item to be purchased by the user based on the image of the merchandise item acquired by the camera device, and display an item recognition result on the touch screen display, the item recognition result being a result of the item recognition operation, wherein the controller is configured to: start a confirmation waiting time during which the controller continues to perform the item recognition operation, the confirmation waiting time including at least a time required for the user to perform an operation for confirmation of the item recognition result; and subsequently, transition to a state in which the controller accepts instructions for payment execution provided by the user.

Another aspect of the present invention provides a checkout-payment system comprising: the above checkout-payment device wherein the camera device comprises: a first camera configured to capture an image of a merchandise item on the table portion; and a second camera configured to capture a face image of a user, wherein, upon receiving the user's instructions for payment execution, the controller performs an operation for face recognition based on a face image of the user captured by the second camera; a server device connected to the checkout-payment device via a network, wherein the server device is configured to perform the operation for face recognition based on the face image of the user captured by the second camera.

Effect of the Invention

According to the present invention, since the touch screen display is arranged opposite to the user across the table portion therebetween, the device has a small footprint and can be easily installed at a small store (stand) that does not have a large space for the installation of devices. Furthermore, the device uses a confirmation waiting time during which a user can perform an operation for confirmation of the item recognition result, which prevents occurrence of an improper change in an item recognition result shown in the touch screen display during the user's operation on the display, and avoids making the user feel uneasy about the device's operation due to the improper change in the result.

BRIEF DESCRIPTION OF THE DRAWINGS

FIG. 6 is an explanatory diagram showing screens displayed on a touch screen display 45 of the checkout counter 1;

FIG. 7 is an explanatory diagram showing screens displayed on the touch screen display 45 of the checkout counter 1;

FIG. 8 is an explanatory diagram showing screens displayed on the touch screen display 45 of the checkout counter 1;

FIG. 9 is an explanatory diagram showing screens displayed on the touch screen display 45 of the checkout counter 1;

FIG. 10 is an explanatory diagram showing screens displayed on the touch screen display 45 of the checkout counter 1;

FIG. 11 is an explanatory diagram showing screens displayed on the touch screen display 45 of the checkout counter 1;

FIG. 16 is a flowchart showing an operation procedure of operations of the checkout counter 1.

DESCRIPTION OF THE PREFERRED EMBODIMENT(S)

Figure 1:
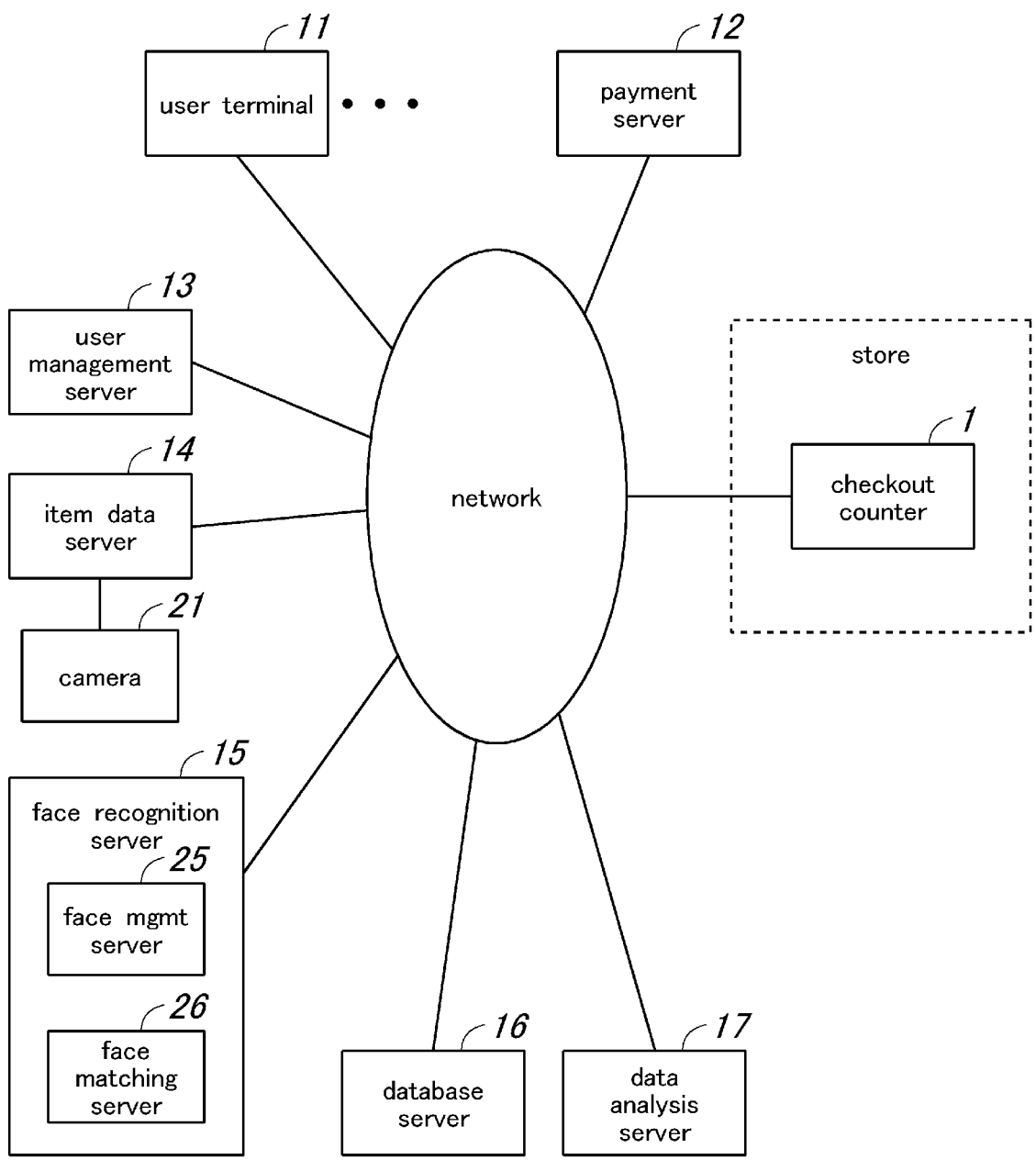
FIG. 1 is a diagram showing an overall configuration of a checkout-payment system according to one embodiment of the present invention.

A first aspect of the present invention made to achieve the above-described object is to provide a checkout-payment device for recognizing a merchandise item chosen by a user from those in a selling space and making checkout and payment for the merchandise item, the device comprising: a table portion on which a user can place a merchandise item to purchase; a touch screen display arranged opposite to the user across the table portion therebetween; a camera device for capturing an image of a merchandise item on the table portion; and a controller configured to perform an item recognition operation for recognizing the merchandise item to be purchased by the user based on the image of the merchandise item acquired by the camera device, and display an item recognition result on the touch screen display, the item recognition result being a result of the item recognition operation, wherein the controller is configured to: start a confirmation waiting time during which the controller continues to perform the item recognition operation, the confirmation waiting time including at least a time required for the user to perform an operation for confirmation of the item recognition result; and subsequently, transition to a state in which the controller accepts instructions for payment execution provided by the user.

In this configuration, since the touch screen display is arranged opposite to the user across the table portion therebetween, the device has a small footprint and can be easily installed at a small store (stand) that does not have a large space for the installation of devices. Furthermore, the device uses a confirmation waiting time during which a user can perform an operation for confirmation of the item recognition result, which prevents occurrence of an improper change in an item recognition result shown in the touch screen display during the user's operation on the display, and avoids making the user feel uneasy about the device's operation due to the improper change.

A second aspect of the present invention is the checkout-payment device of the first aspect, wherein the confirmation waiting time is a predetermined time, and wherein, when the confirmation waiting time has elapsed, the controller accepts the user's instructions for payment execution while displaying the item recognition result confirmed by the user on the touch screen display, followed by transitioning to a non-use state in which the controller does not allow the item recognition result to be reflected in operations for checkout and payment for the merchandise item.

This configuration can prevent occurrence of a change in an item recognition result during the user's operation for providing instructions for payment execution, and avoid making checkout and payment based on a false recognition result. In the non-use state, the controller may control the device such that the device temporarily stops performing the item recognition operation and the operations for checkout and payment, or such that the device continues to perform the item recognition operation and the operations for checkout and payment while not allowing the item recognition result and the checkout operation result to be reflected in operations for checkout and payment.

A third aspect of the present invention is the checkout-payment device of the first aspect, wherein the camera device comprises: a first camera configured to capture an image of a merchandise item on the table portion; and a second camera configured to capture a face image of a user, wherein, upon receiving the user's instructions for payment execution, the controller performs an operation for face recognition based on a face image of the user captured by the second camera.

This configuration can accurately identify a user while saving the user any additional operation.

A fourth aspect of the present invention is the checkout-payment device of the first aspect, wherein the controller, using the touch screen display, displays the item recognition result which has not been confirmed, along with an operation interface which the user can operate to confirm the item recognition result.

This configuration enables a user to operate the touch screen display to thereby confirm the item recognition result. In other cases, the device may be configured to enable a user to use a voice input to confirm the item recognition result.

A fifth aspect of the present invention is the checkout-payment device of the first aspect, wherein, during the confirmation waiting time, the controller provides a visual guidance which urges the user to take the user's hands off the touch screen display.

This configuration can urge a user to take the user's hands off the touch screen display, allowing the device to quickly transition to a state in which the user's hands are not present in the shooting area of the camera device for capturing images of merchandise items.

A sixth aspect of the present invention is the checkout-payment device of the first aspect, wherein the controller, using the touch screen display, displays the item recognition result which has been confirmed by the user, along with an operation interface which the user can operate to provide instructions for payment execution.

This configuration enables a user to operate the touch screen display to thereby provide instructions for payment execution. In other cases, the device may be configured such that a user can use a voice input to provide instructions for payment execution.

A seventh aspect of the present invention is a checkout-payment system comprising: the checkout-payment device of the third aspect; and a server device connected to the checkout-payment device via a network, wherein the server device is configured to perform the operation for face recognition based on the face image of the user captured by the second camera.

In this configuration, the system configured to recognize an item to be purchased through object recognition and allow a user to operate a touch screen display for purchase of the item, can be made space-saving and easily installed at a small store while being configured to avoid interference with object recognition, in the same manner as the first aspect.

Embodiments of the present invention will be described below with reference to the drawings.

EMBODIMENT

FIG. 1 is a diagram showing an overall configuration of a checkout-payment system according to one embodiment of the present invention.

The checkout-payment system is configured to be installed at a small store (stand) in a facility such as an office building or a station, and enable checkout and settlement (payment) to be made for merchandise items purchased by customers, without store clerks or cashiers in the store. The checkout-payment system may be used not only for an unmanned store where there is no store clerks or cashier in the store, but also for a manned store to thereby reduce the burden on store staff.

This checkout-payment system includes a checkout counter 1 (checkout-payment device) installed in a store, a user terminal 11, a payment server 12, a user management server 13, an item data server 14, and a face recognition server 15 (server device), a database server 16, and a data analysis server 17.

The user terminal 11, the payment server 12, the user management server 13, the item data server 14, the face recognition server 15, the database server 16, the data analysis server 17, and the checkout counter 1 installed in the store are connected to each other via networks such as the Internet and/or LANs.

The user management server 13, the item data server 14, the face recognition server 15, the database server 16, and the data analysis server 17 may be located in the store, for example, in a backyard next to a selling space. However, these servers may be provided at a location remote from the store, such as the headquarter of a store operator.

The checkout counter 1 is configured to recognize a merchandise item chosen by a user from those in a selling space of the store, and make checkout and settlement (payment) for the merchandise item. In the present embodiment, the checkout counter 1 identifies merchandise items by object recognition based on images of the merchandise items (item recognition operation), and calculates the total amount of payment from the price (unit price) and the quantity of each merchandise item (checkout operation). In addition, the checkout counter 1 requests the face recognition server 15 to perform a face recognition operation (operation for face recognition), in order to identify a user who is to purchase the merchandise items, and when the face recognition is successfully done, the checkout counter 1 requests the payment server 12 to perform a payment operation (operations for checkout and payment).

The user terminal 11 is configured to perform operations related to user registration (registration of user's membership information and face image) required for users to use the system, and to manage purchase history (receipt information). The user terminal 11 may be a smart phone, a tablet terminal, or any suitable mobile device, and stores some applications for users installed thereon.

The payment server 12 is operated by a payment service provider (such as a credit card company). The payment server 12 performs a payment operation for making payment for merchandise items purchased by a user in response to a payment request from the checkout counter 1. The payment server 12 may be one operated by a payment agency service provider (a payment agency server).

The user management server 13 functions as a login server for managing users' logins and performs an operation for password recognition (i.e. password authentication). The user management server 13 also functions as a payment interface server that links the checkout counter 1 to the payment server 12.

The item data server 14 builds a merchandise item recognition engine to be installed in the checkout counter 1 by using machine learning technology such as deep learning technology. The item data server 14 creates a database for merchandise item recognition through execution of a machine learning algorithm using previously captured images of items to be registered as input data, and also using item ID information including item ID data for each item (such as name of an item) as output data.

The face recognition server 15 has a face management server 25 and a face matching server 26. The face management server 25 stores and manages user data such as name and face information (face ID, face image) for each registered user. The face matching server 26 performs the face recognition operation in response to a request for face recognition from the checkout counter 1. In the face recognition operation, the face recognition server 15 acquires a face image of a subject person from the checkout counter 1, generates a face feature amount of the subject person from the face image, performs a face matching operation by comparing the face feature amount of the subject person with each face feature amount of a corresponding registrant (registered user) stored in the face recognition server for matching, and recognizes the subject person as the registrant (1 to N recognition). Alternatively, the face recognition server 15 may acquire a store visitor list managed by the user management server 13, and narrow down the stored data to the store visitor list, followed by performing the face recognition operation.

The database server 16 stores and manages various types of information. Specifically, the database server stores user management information registered in a user database, such as payment ID, face ID, user ID, password, and office code for each user. The database server stores item master information registered in a database for item management, such as item ID information (e.g., item name and item code). The database for item management also includes information on age-restricted items. The database server further stores purchase log information (e.g., user ID for each user, name and price of each purchased item) registered in a purchase log database.

A data analysis server 17 performs various analysis operations based on information records stored in the database server 16. Specifically, the data analysis server 17 performs analysis operations according to whether or not each visitor user has purchased one or more merchandise items. For example, recorded analysis results may be used to determine ratios of purchasers and non-purchasers for each group selected by certain criteria (such as day of the week, time of day).

In the present embodiment, it is assumed that the system is used in a small store (stand) where there are no partitions around the store, and where users can freely enter and exit the store, and freely take out merchandise items from display shelves and purchase them. However, in other cases, the system may be used in a store having entrance gates or checkers (face recognition machines) in spaces for installation. For example, an entrance checker performs a face recognition operation to determine whether to permit a user to enter the store, and controls opening and closing of an entrance gate according to the result of face recognition at the entrance, the checker, whereas a store exit checker performs the face recognition operation to detect that the user has left the store, and controls opening and closing of a store exit gate according to the face recognition result at the exit. Furthermore, when the store has an extra installation space, a user registration machine may be installed in the store, thereby allowing visitor users to perform user a registration operation in a similar manner to the user terminal 11.

Figure 2:
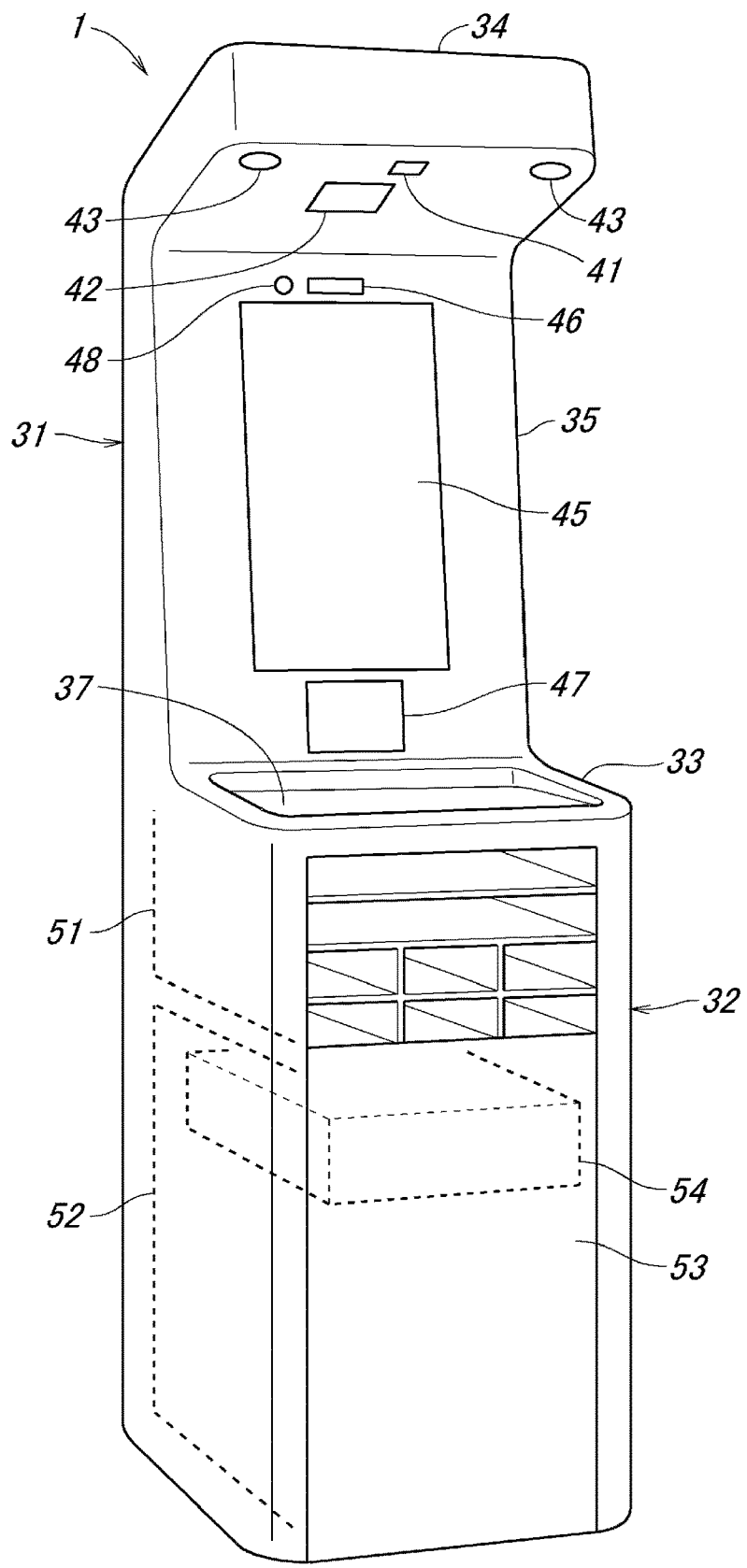
FIG. 2 is a perspective view of an overall appearance of a checkout counter 1.
Figure 3:
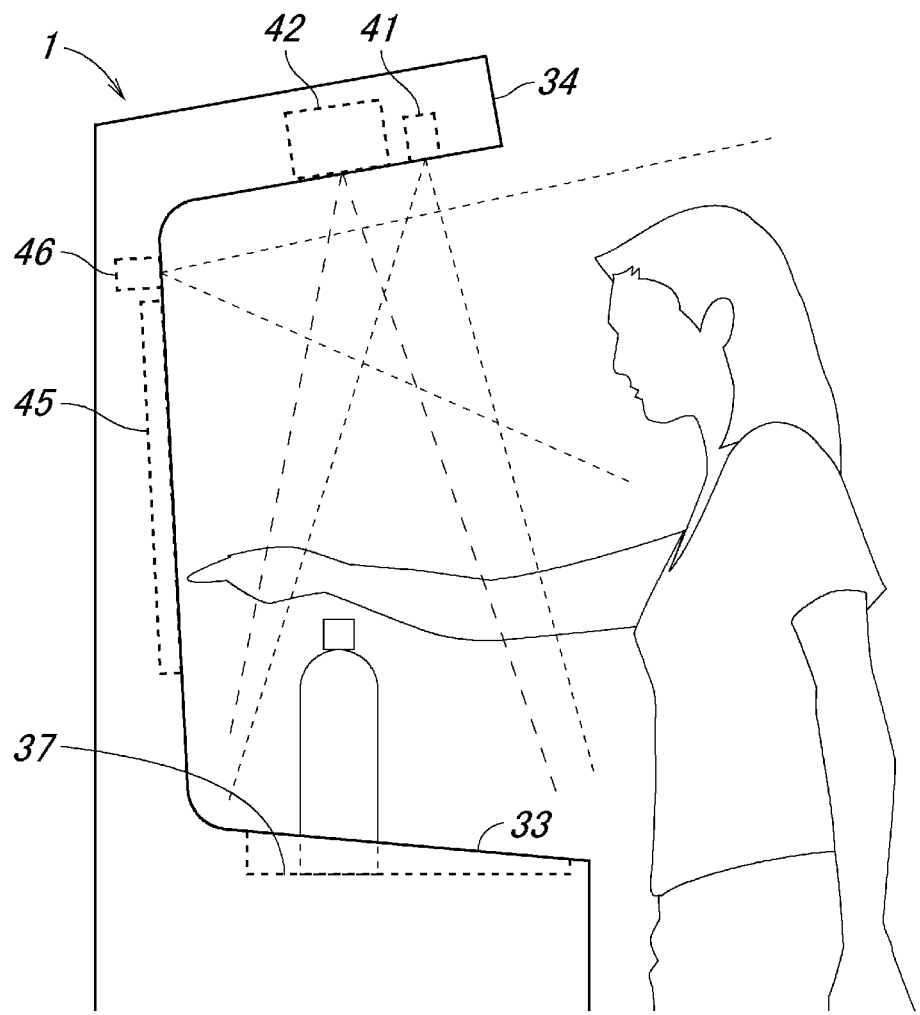
FIG. 3 is a side view of main parts of the checkout counter 1.
Figure 4:
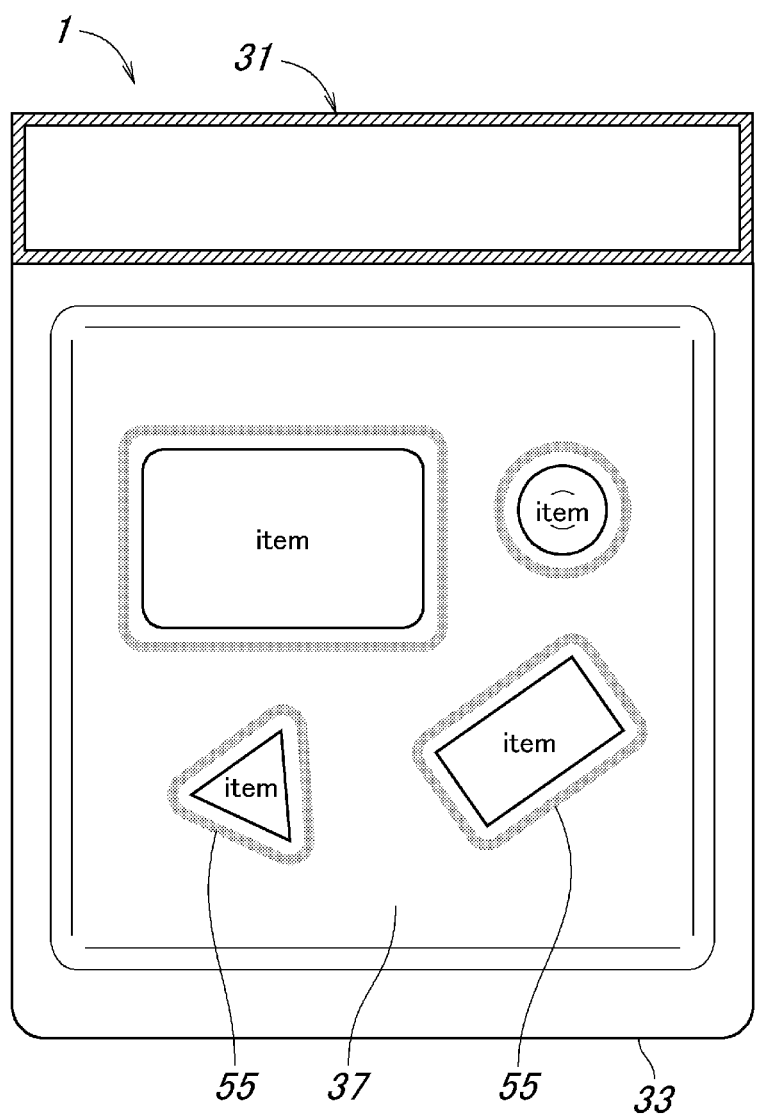
FIG. 4 is a plan view of a top plate portion 33 of the checkout counter 1 viewed from above.

Next, the checkout counter 1 will be described. FIG. 2 is a perspective view of an overall appearance of the checkout counter 1. FIG. 3 is a side view of main parts of the checkout counter 1. FIG. 4 is a plan view of a top plate portion 33 of the checkout counter 1 viewed from above.

As shown in FIG. 2, the checkout counter 1 includes a main body 31 comprised primarily of a box-shaped portion 32, a top plate portion 33, an upper wall portion 34 and a rear wall portion 35. The top plate portion 33 is located at the upper side of the box-shaped portion 32. The rear wall portion 35 is provided so as to protrude upward from the rear side of the box-shaped portion 32. The upper wall portion 34 is provided so as to protrude frontward from the upper end of the rear wall portion 35 to have an eave-like shape.

The top plate portion 33 is provided with a table 37 on which a user can place merchandise items to purchase (items chosen from those in the selling space). When a user places merchandise items side by side on the table 37, the system identifies the items on the table by object recognition, and performs a checkout operation by calculating the total amount to be paid from the unit price of each item. The table 37 has a recessed dish-like shape, so that a user can easily grasp an area for placement of items.

An item shooting camera 41 (first camera) is provided on the upper wall portion 34. The item shooting camera 41 shoots merchandise items on the table 37 of the top plate portion 33. In some cases, the checkout counter 1 may include a plurality of item shooting cameras 41 In this case, it is preferable that one camera 41 is provided at a position above the table to capture an image of items on the table 37 from directly above so that the captured image is used for detecting the position of each item on the table 37, while another camera 41 is provided at a different position to capture an image of items on the table 37 viewed obliquely from above so that the captured image is used for recognizing each item (determining each item's name) on the table 37.

Moreover, a projector 42 is provided on the upper wall portion 34. The projector 42 uses projection mapping technology to project predetermined images onto the table 37 from directly above the table. In the present embodiment, as shown in FIG. 4, the projector 42 projects a frame image 55 surrounding each item on the table 37. In particular, each frame image 55 is projected so as to surround a corresponding item identified through item recognition. This can notify a user of the items that have been identified through item recognition. The user only needs to replace or rearrange the unidentified items.

Referring to FIG. 2, a light 43 is provided on the upper wall portion 34. The light 43 illuminates items on the table 37. This feature can improve the recognition accuracy of an item recognition operation.

A touch screen display 45 (display) is provided on the rear wall portion 35. The touch screen display 45 displays an item recognition result; that is, the recognized items on the table 37. When confirming that there is no error in the item recognition result, a user can perform operations associated with face recognition and password recognition. When finding an error in the item recognition result, a user can perform an operation to correct the items that have been erroneously recognized.

A face recognition camera 46 (second camera) is provided on the rear wall portion 35. The face recognition camera 46 is provided near the touch screen display 45 so as to face a user standing in front of the checkout counter 1. Thus, the face recognition camera can shoot the face of a user viewing the touch screen display 45 the front. A face image captured by the face recognition camera 46 is used for face recognition for payment.

In addition, a speaker 47 is provided on the rear wall portion 35. The speaker 47 outputs a voice for a current user. For example, the speaker 47 outputs an audio guidance to notify the user of a procedure of operations.

A microphone 48 is also provided on the rear wall portion 35. The microphone 48 picks up a voice spoken by a current user. For example, a user can operate an interface for operation (such as button) displayed on the touch screen display 45 by reading out (speaking) words indicated on the interface.

The box-shaped portion 32 is provided with a first storage portion 51 (shelf portion) which opens frontward and a second storage portion 52 with its front side closed by a door 53. The first storage portion 51 stores free items, which are supplied to users free of charge, and which a user can take one home. Examples of free items include shopping bags and cutlery (e.g. spoon, fork). The second storage portion 52 houses a control apparatus 54 (PC) for controlling the item shooting camera 41, the touch screen display 45, and the face recognition camera 46.

As shown in FIG. 3, the item shooting camera 41 is installed on the upper wall portion 34 so as to face the table 37 and shoots items on the table 37 from above. In use, when a user brings the user's hand close to the touch screen display 45 in order to operate the touch screen display 45, the user's hand enters a shooting area of the item shooting camera 41.

Meanwhile, the checkout counter 1 performs the item recognition operation for recognizing the items on the table 37 based on an image captured by the item shooting camera 41. Thus, the user's operation on the touch screen display 45 in a captured image may interface with the item recognition operation, to thereby erroneously recognize or fail to recognize some items on the table.

Furthermore, the checkout counter 1 displays an item recognition result, a recognition result of the item recognition operation, on the touch screen display 45. In particular, the system generally periodically performs the item recognition operation while updating the item recognition result shown on the touch screen display 45 on a real-time basis. Thus, the user's operation on the touch screen display 45 may cause an improper change in the item recognition result shown on the touch screen display, and such changes make the user feel uneasy about the device's operation. In particular, in cases that a user performs operations to provide instructions for payment execution (settlement), such an improper change in the item recognition result may cause a problem that a payment is made based on an erroneous item recognition result.

In this view, the checkout-payment system of the present embodiment can prevent occurrence of an improper change in an item recognition result shown in the touch screen display 45, and avoid making the user feel uneasy about the device's operation due to the improper change. The system is also configured to avoid making checkout and payment based on an erroneous item recognition result.

Figure 5:
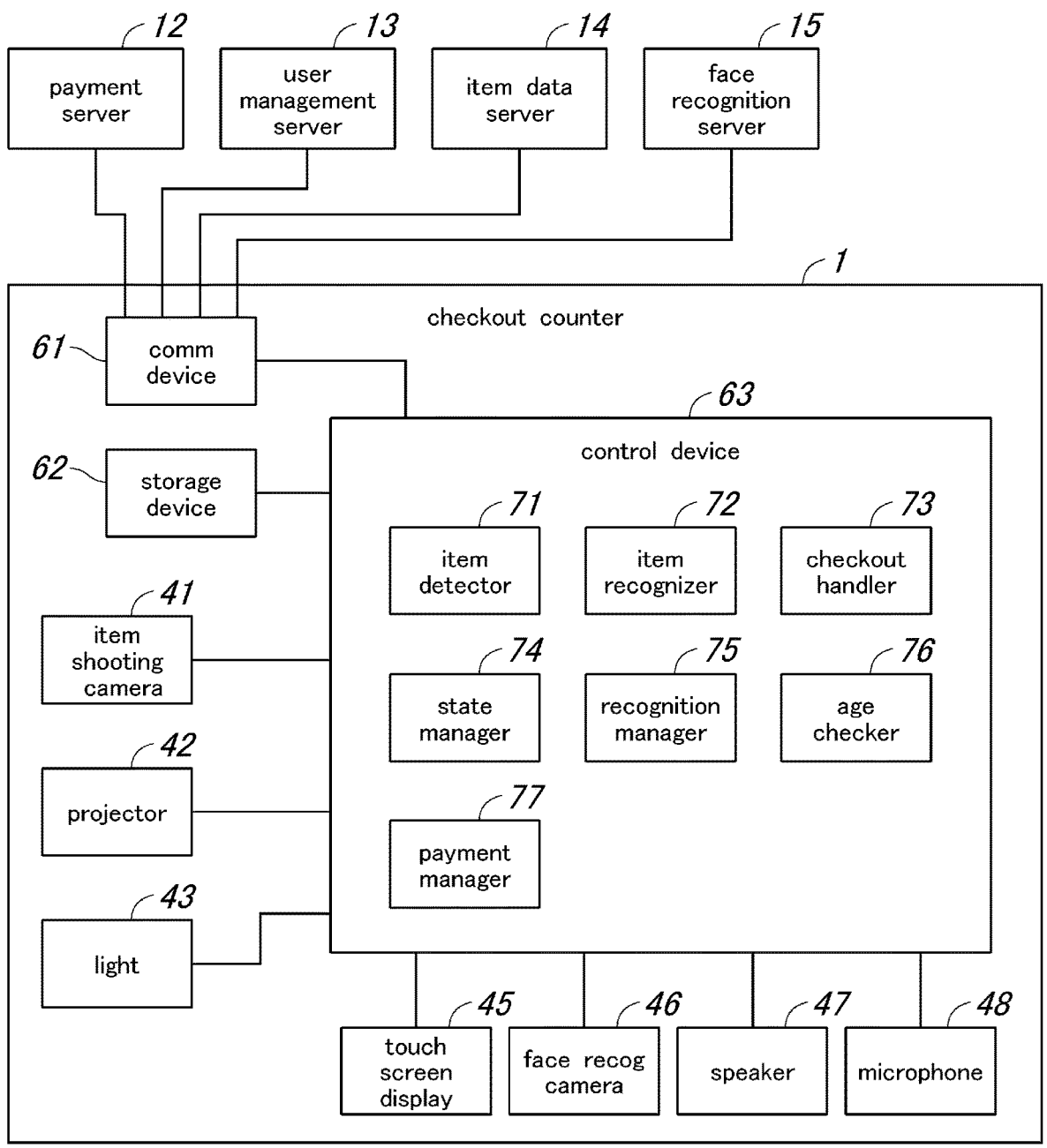
FIG. 5 is a block diagram showing a schematic configuration of the checkout counter 1.

Next, a schematic configuration of the checkout counter 1 will be described. FIG. 5 is a block diagram showing a schematic configuration of the checkout counter 1.

The checkout counter 1 includes a communication device 61, a storage device 62, and a control device 63, in addition to the item shooting camera 41, the projector 42, the light 43, the touch screen display 45, the face recognition camera 46, the speaker 47, and the microphone 48 (see FIGS. 2 and 3). The control apparatus 54 consists primarily of the communication device 61, the storage device 62, and the control device 63 (see FIG. 2).

The communication device 61 communicates with the payment server 12, the user management server 13, the item data server 14, and the face recognition server 15 via a network.

The storage device 62 stores programs to be executed by a processor that is a primary part of the control device 63. The storage device 62 stores item master information. Specifically, the storage device 62 stores, as the item master information, item ID information (such as item name, and item code), information used in the item recognition operation (i.e., item ID information including ID data for each item such as item name), information used in the checkout operation (i.e., the price (unit price) of each item), and information on age-restricted items.

The control device 63 includes an item detector 71, an item recognizer 72, a checkout handler 73, a state manager 74, a recognition manager 75, an age checker 76, and a payment manager 77. The control device 63 is configured by the processor, and each functional unit of the control device 63 is implemented by executing a program stored in the storage device 62 by the processor.

The item detector 71 detects that an item has been placed on the table 37 based on an image captured by the item shooting camera 41 configured to shoot the table 37. The item detector 71 detects the position of an item based on an image captured by the item shooting camera 41 when the item is placed on the table 37.

The item recognizer 72 recognizes an item on the table 37 based on an image captured by the item shooting camera 41. In the present embodiment, the item recognizer 72 acquires item ID information (such as an item name) from an item image that is cut out from an image captured by the item shooting camera 41, by using an object recognition engine, the object recognition engine being built by using machine learning technology such as deep learning technology.

The checkout handler 73 makes checkout for items placed on the table 37 based on an item recognition result provided from the item recognizer 72. Specifically, the checkout handler 73 acquires the price (unit price) of each item on the table 37, totals the prices of the respective items, and calculates the total price (totaling operation).

When a user performs a confirmation operation for confirming the item recognition result provided by the item recognizer 72, the state manager 74 starts a predetermined confirmation waiting time (for example, several seconds) to continue the item recognition operation and the checkout operation. During the confirmation waiting time, the state manager 74 can perform controls so as not to allow the item recognition result and the checkout operation result to be reflected in a display operation in real time.

The state manager 74 performs controls so that the checkout counter 1 transitions to a non-use state upon the elapse of the predetermined waiting time. In the non-use state, the state manager 74 performs controls so that the checkout counter 1 temporarily stops performing the item recognition operation and the checkout operation. In other cases, the state manager 74 may continue the item recognition operation and the checkout operation, and then perform controls so that the item recognition result and the checkout operation result are not reflected in the settlement (payment).

The recognition manager 75 instructs the face recognition server 15 to identify a user who is to make payment, through face recognition, and also instructs the user management server 13 to perform password recognition. In the present embodiment, two-factor authentication; that is, a combination of face recognition and password recognition is adopted for enhanced security, and the recognition manager 75 permits the checkout counter 1 to make payment only when both face recognition and password recognition are successfully done. In an operation for face recognition, the recognition manager 75 extracts a face image of a user from an image captured by the face recognition camera 46 and transmits the face image to the face recognition server 15. In an operation for password recognition, the recognition manager 75 transmits a user ID and a password entered by the user to the user management server 13.

The age checker 76 acquires a user's age information (date of birth or current age) specified by face recognition, provided from the user management server 13. Then, based on the age information, the age checker 76 determines whether or not the user identified by face recognition is subject to age restrictions on purchase of age-restricted items; that is, whether or not the user is underage (age verification). The age verification operation is performed when the items recognized by the item recognizer 72 include age-restricted items such as alcoholic beverages.

The payment manager 77 instructs the payment server 12 to perform the payment operation for payment of the total price calculated in the checkout operation for the user (payer) identified by face recognition.

In addition, based on the item's position data acquired by the item detector 71, the control device 63 of the checkout counter 1 controls the projector 42 to project a frame image(s) 55 (see FIG. 4) onto the table 37 (projection mapping). Furthermore, the control device 63 performs voice recognition in response to a voice issued by a user and picked up by the microphone 48. This feature enables a user to operate a screen by using voice input.

The control device 63 controls the amount of light that is emitted from the light 43 and illuminates the table 37. The brightness of items placed on the table 37 changes according to the peripheral brightness (sunlight) conditions. Thus, the control device 63 detects the brightness of the table 37 based on an image captured by the item shooting camera 41 and on an output of an illuminance sensor (not shown), and controls an amount of light from the light 43 based on the detection result.

In the present embodiment, the checkout counter 1 performs the item recognition operation. However, the system may be configured such that an external server performs the item recognition operation.

In the present embodiment, the checkout counter 1 acquires age information including the age of a user identified by face recognition, from the user management server 13, and performs the age verification operation based on the age information. However, the system may be configured such that the face recognition server 15 performs the age verification operation. In this case, the system may be configured such that the checkout counter 1 adds an age verification instruction to a request for face recognition and transmits the request to the face recognition server 15, and the face recognition server 15 transmits a face verification response including an age verification result to the checkout counter 1.

Next, screens displayed on the touch screen display 45 of the checkout counter 1 will be described. FIGS. 6 to 11 are explanatory diagrams showing various screens displayed on the touch screen display 45 of the checkout counter 1.

The touch screen display 45 of the checkout counter 1 first displays a checkout guidance screen shown in FIG. 6A. The checkout guidance screen shows a guidance message 101 for urging a user to place items on the table 37 of the checkout counter 1, and a guidance image 102 (picture guidance) indicating how to place the items. Then, when the user places the items on the table 37, the checkout counter 1 performs the item recognition operation and the checkout operation, and the screen changes to an item confirmation screen in an unconfirmed state; that is, before the item confirmation screen prior to the user's confirmation (see FIG. 6B).

The checkout guidance screen also shows a guidance message 103 for indicating how to operate an interface on the screen by a user's speech (voice input). In the present embodiment, a user can operate each interface (such as a button) displayed on the touch screen display 45 by reading out words shown on the interface.

The item confirmation screen in the unconfirmed state (hereafter also referred to as "unconfirmed item confirmation screen") shown in FIG. 6B shows a guidance message 104 for urging a user to confirm recognized items. The unconfirmed item confirmation screen also includes a recognition result indicator 105. The recognition result indicator 105 includes listed item boxes 115 (item indicators), each box showing a corresponding item's name and price. The listed item boxes 115 are associated with corresponding items on the table 37 placed by the user, in particular the items recognized by the item recognition operation, and the multiple listed item boxes 115 are shown side by side.

The unconfirmed item confirmation screen includes a checkout operation result indicator 116. The checkout operation result indicator 116 shows a checkout operation result; that is, the total number of items on the table 37 and the total price therefor.

This unconfirmed item confirmation screen also includes a "confirm" button 112 and a "cancel" button 119. When a user operates the "confirm" button 112, the screen transitions to a guidance screen (see FIG. 6C). The "confirm" button 112 is displayed in blue in the initial state, and changes to in gray after being operated. When a user operates the "cancel" button 119, the screen transitions to a cancel screen (see FIG. 8D). Also, when a user removes the items on the table 37, the screen transitions to the cancel screen.

The guidance screen shown in FIG. 6C includes a guidance message 101 for urging a user to take the user's hands off the touch screen display 45 as scanning is in progress, and a guidance image 102 (picture) indicating how to take hands off of the touch screen display 45. Simultaneously, the checkout counter 1 outputs a guidance voice from the speaker 47 for urging the user to take the user's hands off the touch screen display 45.

The item confirmation screen in a confirmed state (screen for enter payment instructions) shown in FIG. 6D includes a "checkout" button 117 (interface for enter instructions for payment execution), and a "re-scan" button 118. The remaining part of the item confirmation screen in the confirmed state (hereafter also referred to as "confirmed item confirmation screen") is the same as the unconfirmed item confirmation screen (see FIG. 6B).

Then, when the user operates the "checkout" button 117, the screen changes to a face recognition screen (see FIG. 7A).

When the user operates the "re-scan" button 118, the checkout counter 1 performs a re-scan operation; that is, the item recognition operation and checkout operation again, and the screen changes to the unconfirmed item confirmation screen (FIG. 6B). More specifically, when an erroneous recognition occurs in the item recognition operation, resulting in that the recognition result indicator 105 shows an item recognition result including an error, the user can operate the "re-scan" button 118. In cases where, after the user operates the "confirm" button 112 on the unconfirmed item confirmation screen (see FIG. 6B), the user replaces (adds or removes) some items on the table 37 (e.g., when there is an item that the user has failed to place on the table and needs to place it later, or when the user reconsiders purchase of some items and needs to take out the items from the table 37), the user should just operate the "re-scan" button 118. When re-scanning does not correct an error in the item recognition result, the checkout counter may display guidance information for urging a user to change the way items are placed.

When the confirmed item confirmation screen is displayed and a user wants to correct (delete or change) some listed items in the recognition result indicator 105, the user operates listed item boxes 115 for erroneously listed items. As a result, the screen transitions to a change/delete selection screen (see FIG. 10A).

The face recognition screen shown in FIG. 7A displays a captured image 121 of a user and a guidance message 122 for urging the user to adjust the face position in the image when the user's face image is not inside a predetermined frame. Then, the user adjusts the face position while viewing the user's image 121 displayed on the screen. When the adjustment is properly done, the checkout counter transmits the face image to the face recognition server 15 so that the face recognition server starts a face recognition operation. When the face image is transmitted, the screen transitions to a face recognition screen (see FIG. 7B) indicating that face recognition is in progress.

The face recognition screen shown in FIG. 7B displays a face image 123 extracted from the captured image of the user and a progress indicator 124 for visualizing the progress of the face recognition operation.

When face recognition is successfully done, the screen changes to a face recognition result confirmation screen (see FIG. 7C). When face recognition fails, the system re-acquires a face image and repeats the operation for face recognition a predetermined number of times. When face recognition fails a predetermined number of times in succession, the system stops the face recognition operation, shifts to a mode in which payment is allowed to be done only by password recognition, and the screen transitions to a user ID selection screen (see FIG. 9A).

The face recognition result confirmation screen shown in FIG. 7C displays a user's face image 123 and a guidance message 126 for inquiring the user if the user's name is correct. The face recognition result confirmation screen includes a "yes" button 127 and a "no" button 128. When the user operates the "no" button 128, the screen transitions to the user ID selection screen (see FIG. 9A).

In cases where the user operates the "yes" button 127 in the face recognition result confirmation screen, when there is no age-restricted item among the items to be purchased by the user, the screen changes to a password recognition screen (see FIG. 8A). When the items to be purchased by the user include one or more age-restricted items, the checkout counter makes age verification on the user identified by face recognition. When the user reaches a specific age (minimum age) that allows for purchase of age-restricted items, the screen transitions to a password recognition screen (see FIG. 8A). When the user has not reached the specific age (minimum age), the screen transitions to an error screen (see FIG. 7D).

The error screen shown in FIG. 7D displays an image 137 and a guidance message 138 indicating that the user is subject to age restrictions on purchase of age restricted items (i.e., the user is underage) and not allowed to purchase age-restricted items such as alcoholic beverages and tobacco. The error screen also includes a "return" button 129. When the user operates the "return" button 129, the screen returns to the unconfirmed item confirmation screen (see FIG. 6B). This allows the user to remove age-restricted items and then cause the system to re-perform the necessary operations.

In the screens shown in FIGS. 7A to 7D, each screen includes the checkout operation result indicator 116 and the "cancel" button 119, which are the same as those included in the confirmed item confirmation screen (see FIG. 6D).

The password recognition screen shown in FIG. 8A includes a guidance message 131 for urging a user to enter a passcode as a password, an image 132 showing the progress of passcode entry, and a numeric keypad 133. When the user enters a PIN consisting of a predetermined number of digits, the system performs password recognition. Then, when the password recognition is successfully done, the screen transitions to a payment confirmation screen (see FIG. 8B). When the password recognition fails, the screen transitions to a password recognition screen for re-entry (see FIG. 9C).

The password recognition screen includes a "pay" button 135 and a "return" button 129. When the user operates the "return" button 129, the process returns to a state when a user has not yet enter the user's passcode. In this case, the "pay" button 135 is shown in gray and disabled.

In the payment confirmation screen shown in FIG. 8B, the "pay" button 135 is enabled, and when the user operates the "pay" button 135, the screen transitions to a payment completion screen (see FIG. 8C).

The checkout operation result indicator 116 and the "cancel" button 119, which are included in the screens shown in FIGS. 8A and 8B, are the same as those shown in the confirmed item confirmation screen (see FIG. 6D).

The user ID selection screen shown in FIG. 9A includes a guidance message 141 for urging a user to select the user's user ID, and user ID buttons 142. These user ID buttons 142 are associated with different user IDs and displayed in a row. This user ID selection screen also includes a "no candidate" button 143. When the user finds a user ID button 142 for the user's user ID and operates the user ID button, the screen transitions to the password recognition screen (see FIG. 8A). When the user operates the "no candidate" button 143 as the user's user ID is not included, the screen transitions to an error screen (see FIG. 9B) indicating that payment is not possible.

In the present embodiment, user ID candidates are displayed so that a user can select one of them. However, the system may be configured such that a keyboard is displayed so that a user can enter the user's user ID.

In the present embodiment, the face recognition server 15 acquires some persons with relatively high face matching scores for the user in the face recognition operation. The user ID selection screen displays different user ID buttons 142 for the respective user ID candidates, which are associated with the persons with relatively high face matching scores. When finding no person whose face matching score is equal to or greater than a predetermined threshold, the face recognition server 15 determines that face matching has failed, but still extracts, as candidates, a predetermined number of persons from the persons whose face matching scores, which are lower than the threshold, in descending order of the face matching score.

The password recognition screen for re-entry shown in FIG. 9C includes a guidance message 145 indicating that the entered password is invalid. The other part of the password recognition screen for re-entry is the same as the password recognition screen (see FIG. 8A). Using this screen, the user re-enters a password. When the password recognition operation is successfully done, the screen transitions to the payment confirmation screen (see FIG. 8B). When the password recognition fails again, the screen transitions to an incorrect password error screen (see FIG. 9D).

The checkout operation result indicator 116 and the "cancel" button 119 in the screens shown in FIGS. 9A and 9C are the same as those in the confirmed item confirmation screen (see FIG. 6D).

A change/delete selection screen shown in FIG. 10A displays listed item boxes 115 in a row in a similar manner to the confirmed item confirmation screen (see FIG. 6D). However, in this screen, a listed item box 115 that has been selected by the user on the confirmed item confirmation screen is displayed in a different way as a listed item box 152. The remaining part of this screen is the same as that of the confirmed item confirmation screen (see FIG. 6D).

The listed item box 152 includes a "delete" button 153 and a "change" button 154. When the user operates the "delete" button 153, the screen transitions to a deletion confirmation screen (see FIG. 11B). When the user operates the "change" button 154, the screen transitions to an item category selection screen (see FIG. 10B).

The item category selection screen shown in FIG. 10B includes a guidance message 156 for urging a user to select an item (category), a remove item indicator 157 for displaying the item data (name and price) of an item to be changed, and respective category buttons 158. The item category selection screen also includes a "return" button 129. When a user operates a category button 158, the screen changes to a new item selection screen (see FIG. 10C). When the user operates the "return" button 129, the screen returns to the previous screen; that is, the change/delete selection screen (see FIG. 10A).

An item selection screen shown in FIG. 10C includes a plurality of item buttons 160 for items included in the category that the user has selected in the item category selection screen (see FIG. 10B). When the user operates an item button 160, the screen transitions to an item change confirmation screen (see FIG. 10D). In this screen, the guidance message 156, the remove item indicator 157, and the "return" button 129 are the same as those of the item category selection screen (see FIG. 10B).

An item change confirmation screen shown in FIG. 10D includes a guidance message 161 indicating that some item will be replaced, a remove item indicator 162 for displaying data (name and price) of the item to be replaced, and data (name and price) of a new item. The item change confirmation screen also includes a "yes" button 165 and a "no" button 166. When the user operates the "yes" button 165, the screen transitions to an item list confirmation screen (see FIG. 11A). When the user operates the "no" button 166, the screen returns to the item selection screen (see FIG. 10C).

An item list confirmation screen shown in FIG. 11A is similar to the confirmed item confirmation screen (see FIG. 6D). However, in this screen, the listed item box 115 associated with the new item is displayed at the first (top) position and highlighted in a different color from the other listed item boxes 115.

A delete confirmation screen shown in FIG. 11B includes a guidance message 171 indicating that the item will be deleted, and a delete item indicator 172 for displaying data (name and price) of the item to be deleted. The delete confirmation screen also includes a "yes" button 173 and a "no" button 174. When the user operates the "yes" button 173, the screen transitions to an item list confirmation screen (see FIG. 11C). When the user operates the "no" button 174, the screen returns to the change/delete selection screen (see FIG. 10A).

An item list confirmation screen shown in FIG. 11C shows listed item boxes 152 shown in the recognition result indicator 105 except that the deletion operation is reflected. Specifically, the listed item box 115 subject to the delete operation is displayed in gray. In other cases, a different item list confirmation screen shown in FIG. 11D may be displayed. In this item list confirmation screen, a "return" button is provided in the listed item box 115. When the user operates this "return" button, the screen returns to the change/delete selection screen (see FIG. 10A).

In the screens shown in FIGS. 11A to 11D, the checkout operation result indicator 116 and the "cancel" button 119 are the same as those of the confirmed item confirmation screen (see FIG. 6D).

Figure 12:
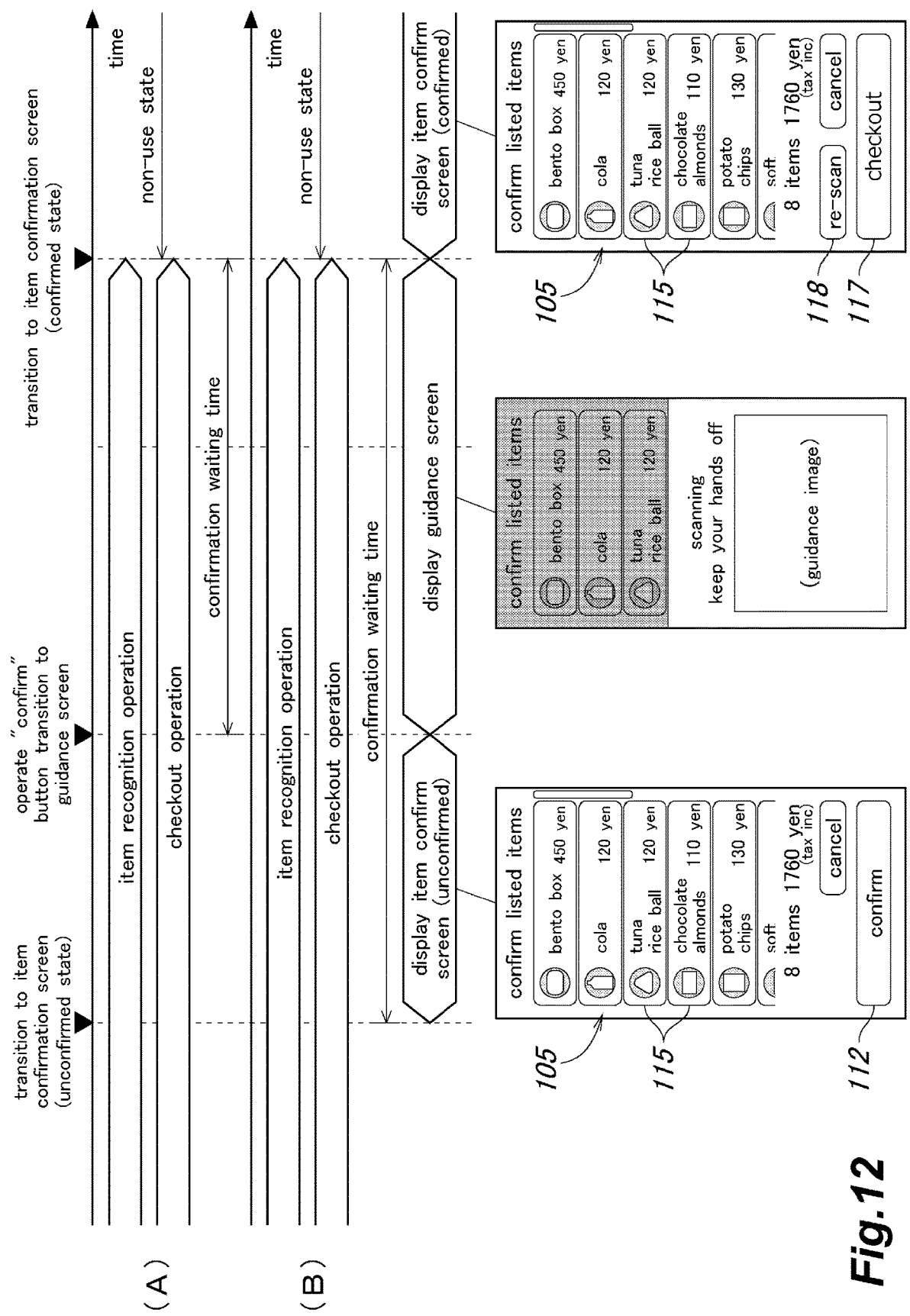
FIG. 12 is an explanatory diagram showing a confirmation waiting time and a non-use state of the checkout counter 1.

Next, a confirmation waiting time and a non-use state of the checkout counter 1 will be described. FIG. 12 is an explanatory diagram showing a confirmation waiting time and a non-use state of the checkout counter 1.

As shown in FIG. 12A, in the present embodiment, when a user views the unconfirmed item confirmation screen (see FIG. 6B) and confirms that there is no error in an item recognition result displayed in the recognition result indicator 105, the user performs an operation for confirming the item recognition result, specifically, operates the "confirm" button 112 to start a confirmation waiting time. The confirmation waiting time includes a certain time required for a user to take the user's hand off the touch screen display after the operation.

During the confirmation waiting time, the checkout counter 1 continues the item recognition operation and the checkout operation. During the confirmation waiting time, the state manager 74 can perform controls so as not to allow the item recognition result and the checkout operation result to be reflected in a display operation, which means that the checkout counter 1 stops updating what is indicated in the recognition result indicator 105.

Before a user performs an operation for confirming the item recognition result, the checkout counter 1 continues to repeat the item recognition operation at regular intervals, and thus the user can change (add or remove) items on the table 37. Specifically, the user can additionally place a misplaced item on the table 37 or remove from the table 37 an item of which the user has cancelled the purchase. When the user changes some items on the table, the item recognition result displayed on the touch screen display 45 changes.

The confirmation waiting time is a predetermined time period (e.g., several seconds) from the user's operation for confirming the item recognition result. The confirmation waiting time is a return time that it takes for the item recognition operation to return to its normal state. Specifically, the confirmation waiting time includes a time required for a user to take hand off the touch screen display 45 and out of the shooting area of the item shooting camera 41 (operation time). As a result, even when a user takes the user's hand off the touch screen display 45 causing an unnatural change in what is displayed on the touch screen display 45, the item recognition operation immediately returns to normal, which prevents the user from feeling uneasy about the device's operation.

Next, when the confirmation waiting time elapses, the screen changes to the confirmed item confirmation screen in which the item recognition result and the checkout operation result are reflected (see FIG. 6D). Then, as the item recognition result and the checkout operation result are shown as confirmed information, the checkout counter 1 transitions to a non-use state. In the non-use state, the state manager 74 performs controls so that the checkout counter 1 temporarily stops performing the item recognition operation and the checkout operation. In other cases, the state manager 74 may perform controls so that the system continues the item recognition operation and the checkout operation, and that the item recognition result and the checkout operation result are not reflected in the display operation in real time.

Then, when the user views the confirmed item confirmation screen and confirms that there is no error in the displayed item recognition result, the user performs operations to provide instructions for payment execution (settlement), specifically, operates the "checkout" button 117. Upon completion of the user's operation, the checkout counter is in the non-use state and the state manager 74 performs controls so that the checkout counter 1 temporarily stops performing the item recognition operation and the checkout operation, or so that the item recognition result and the checkout operation result are not reflected in the display operation in real time. Thus, this configuration prevents occurrence of any change in the item recognition result and checkout operation result displayed on the screen, and avoids making checkout and payment based on a false recognition result.

When the unconfirmed item confirmation screen is displayed, the checkout counter 1 continues to repeat the item recognition operation at regular intervals. Thus, when a user changes (add or remove) items on the table 37 (e.g., placing an item which the user has misplaced on the table 37 or removing an item which the user cancelled the purchase of from the table 37, what is displayed in the recognition result indicator 105 is updated accordingly.

After the screen transitions to the confirmed item confirmation screen, the user may want to replace (add and/or remove) some items on the table 37. In this case, the user may operate a "re-scan" button 118 in the confirmed item confirmation screen, thereby causing the check counter to re-perform the item recognition operation.

In other cases, as shown in FIG. 12B, the state manager 74 may start a confirmation waiting time at the time when the screen transitions to the unconfirmed item confirmation screen (see FIG. 6B). In this case, the confirmation waiting time includes a time for a user to view the unconfirmed item confirmation screen, operate the "confirm" button 112, and take hand off the touch screen display 45 and out of the shooting area of the item shooting camera 41 (operation time).

As a result, even when a user reaches the user's hand to the touch screen display 45 in order to operate the "confirm" button 112 causing an unnatural change in what is displayed on the touch screen display 45, the item recognition operation immediately returns to normal, which prevents the user from feeling uneasy about the device's operation.

Figure 13:
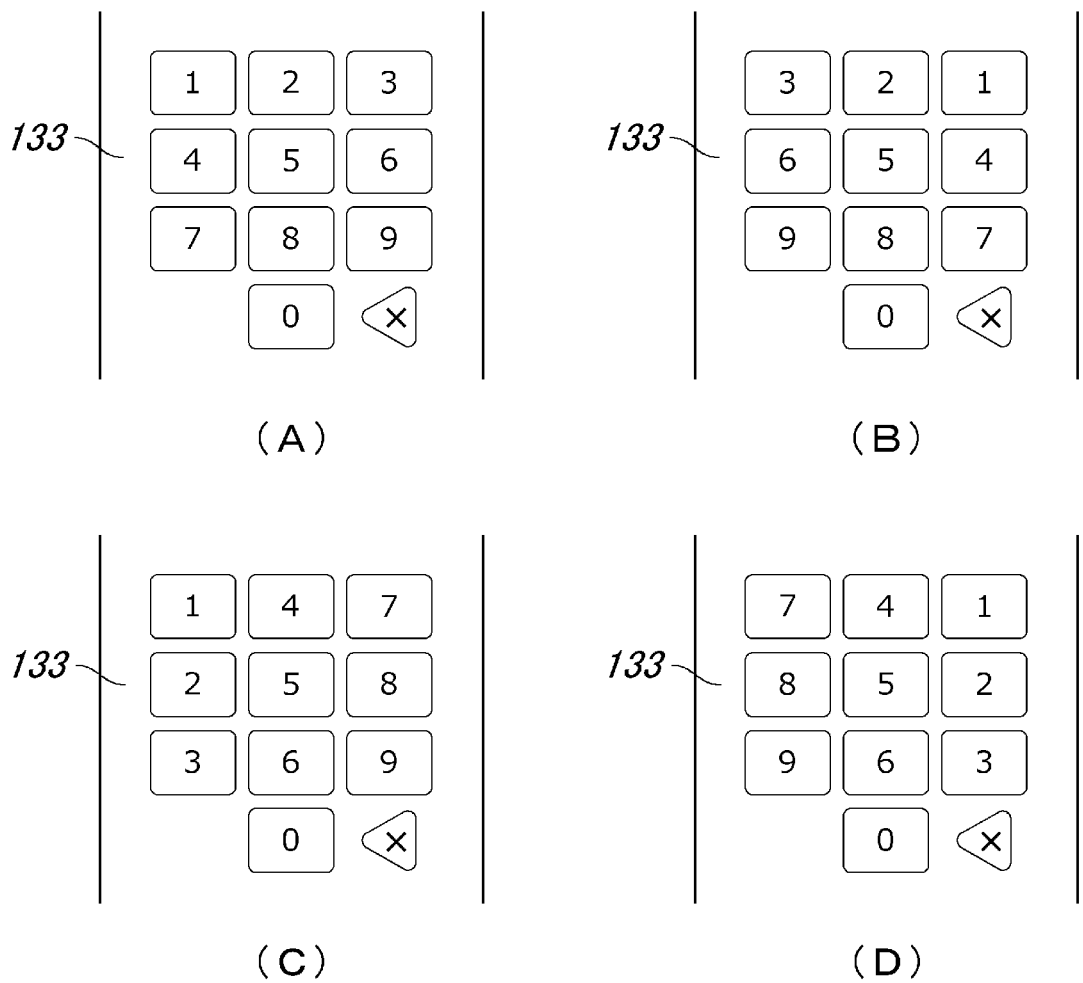
FIG. 13 is an explanatory diagram showing examples of changes of key layout of a numeric keypad 133 displayed on the touch screen display 45 of the checkout counter 1.

Next, changes of the key layout of a numeric keypad 133 displayed on the touch screen display 45 of the checkout counter 1 will be described. FIG. 13 is an explanatory diagram showing examples of changes of the key layout of the numeric keypad 133 displayed on the touch screen display 45 of the checkout counter 1.

In the present embodiment, a user needs to enter a password (passcode) using the numeric keypad 133 in the password recognition screen (see FIG. 8A). The touch screen display 45 of the checkout counter 1 is provided so as to face the user. Thus, in some cases, when the user enters a password, another person behind the user can pry into the screen and see how a finger of the user moves, resulting in that the user's password is stolen.

In this view, in the present embodiment, the system is configured to change the key layout pattern of the numeric keypad 133 in the password recognition screen every time the user changes. For example, the layout pattern of the numeric keys "1" to "9" is changed as shown in FIGS. 13A to 13D. In the examples shown in FIGS. 13A to 13D, one of the four keyboard layout patterns are randomly selected every time the user changes.

In the present embodiment, when the user enters an invalid password (passcode) on the password recognition screen (see FIG. 8A), the screen transitions to the password recognition screen for re-entry (see FIG. 9C), in which the key layout pattern is changed from the previous password recognition screen (see FIG. 8A).

In the examples shown in FIGS. 13A to 13D, the 3×3 key layout of the numeric keypad 133 is changed under a specific rule. In other cases, the 3×3 key layout of the numeric keypad 133 may be changed randomly. Alternatively, the layout of all elements of the keypad may be changed.

Figure 14:
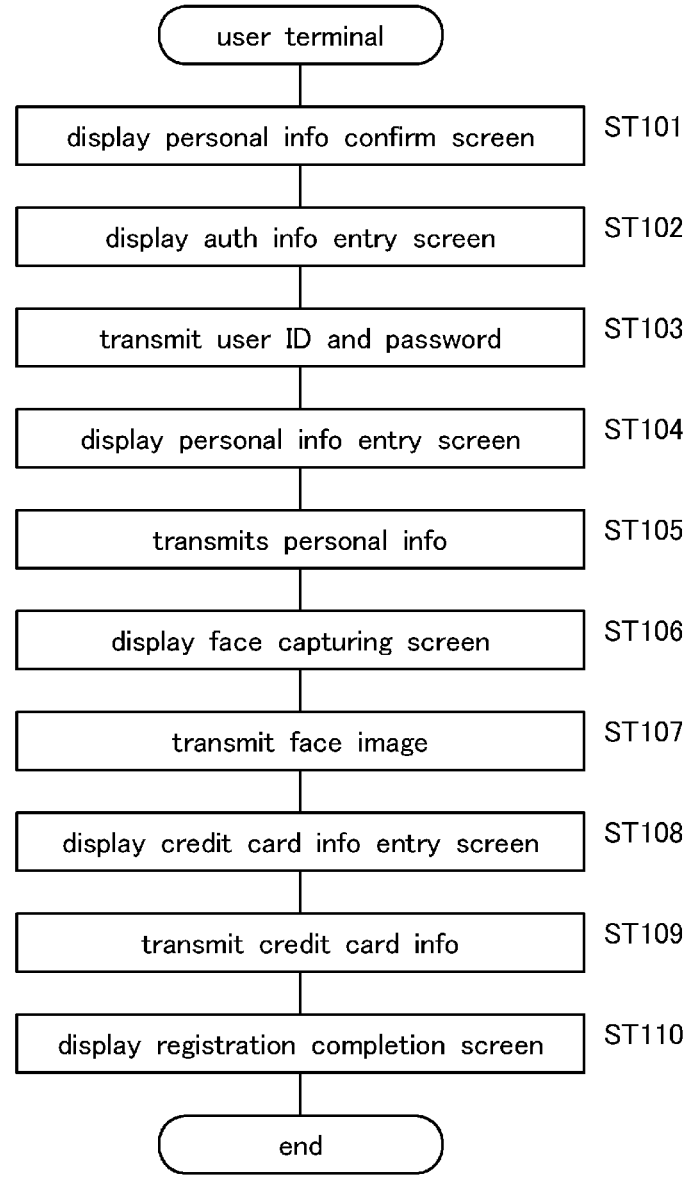
FIG. 14 is a flowchart showing an operation procedure of operations of a user terminal 11 for user registration.

Next, an operation procedure of operations of a user terminal 11 for user registration will be described. FIG. 14 is a flowchart showing an operation procedure of operations of a user terminal 11 for user registration.

When a necessary application that has been installed on the user terminal 11 is activated for the first time, the user terminal 11 displays a personal information confirmation screen (ST101). The personal information confirmation screen indicates a consent form for the handling of personal information. When the user performs an operation for approval of the consent form on the personal information confirmation screen, the user terminal 11 displays an authentication information entry screen (ST102).

Next, when the user performs an operation for entry of the user's user ID and password on the authentication information entry screen, the checkout counter transmits the entered user ID and password to the user management server 13 (ST103).

Next, the user terminal 11 displays a personal information entry screen (ST104). On the personal information input screen, the user can enter personal information such as date of birth. When the user performs an operation for entry of personal information on the personal information entry screen, the checkout counter transmits the personal information such as one including the date of birth to the user management server 13 (ST105).

Next, the user terminal 11 displays a face capturing screen (ST106). When the user performs an operation for capturing the user's face on the face capturing screen, the checkout counter extracts a face image from a captured image and transmits it to the user management server 13 (ST107).

The user management server 13 performs operations for registration of the user's user ID and password transmitted from the user terminal 11. Also, the user management server 13 transmits the face image transmitted from the user terminal 11 to the face recognition server 15, where the face recognition server 15 performs an operation for registering the face image.

Next, the user terminal 11 displays a credit card information entry screen (ST108). When the user performs an operation for entry of credit card information on this credit information entry screen, the user terminal 11 transmits the credit card information to the payment server 12 (ST109). The payment server 12 performs an operation for registering the credit card information transmitted from the user terminal 11.

Next, when receiving a notification of completion of the credit card information registration from the payment server 12, the user terminal 11 displays a registration completion screen (ST110).

Figure 15:
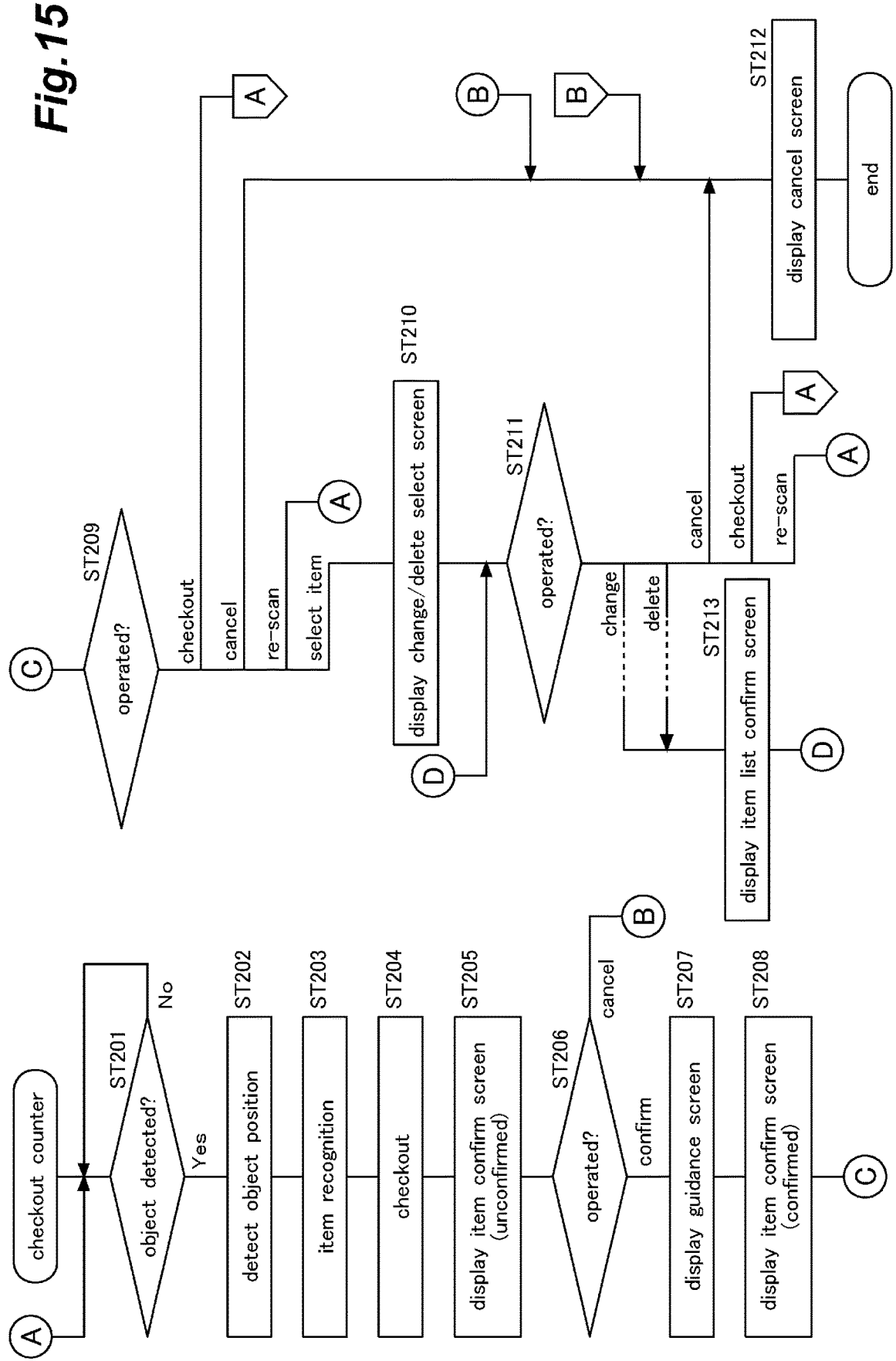
FIG. 15 is a flowchart showing an operation procedure of operations of the checkout counter 1.

Next, an operation procedure of operations of the checkout counter 1 will be described. FIGS. 15 and 16 are flowcharts showing an operation procedure of operations of the checkout counter 1.

First, when detecting that an object has been placed on the table 37 based on an image captured by the item shooting camera 41 (Yes in ST201), the checkout counter 1 detects the position of a detected object on the table 37 (item detection operation) (ST202). Then, the checkout counter 1 identifies which item the object on table 37 is (ST203). Then, the checkout counter 1 makes checkout for the item on table 37 (ST204). Next, the checkout counter 1 displays the unconfirmed state item confirmation screen (see FIG. 6B) (ST205).

Next, when the user operates the "confirm" button 112 on the unconfirmed item confirmation screen (see FIG. 6B) ("confirm" in ST206), the checkout counter 1 displays a guidance screen (see FIG. 6C) (ST207). Also, the checkout counter 1 outputs an audio guidance for urging the user to take the user's hand off the touch screen display 45, such as a voice guidance saying "take your hand off the screen."

Next, the checkout counter 1 displays the confirmed item confirmation screen (screen for entering payment instructions) (see FIG. 6D) (ST208). When the user operates the "checkout" button 117 ("checkout" in ST209) on the confirmed item confirmation screen, the process proceeds to face recognition, and the checkout counter displays the face recognition screen (see FIG. 7A) (ST221). Then, the checkout counter 1 determines whether or not an age-restricted item(s) is included in the items to be purchased. When detecting that an age-restricted item is included, the checkout counter 1 turns on an age-restriction flag.

When the user performs an operation for cancellation of the purchase, specifically, operates the "cancel" button 119 ("cancel" in ST209), the screen transitions to the cancel screen (see FIG. 8D) (ST212). Furthermore, when the user operates the "re-scan" button 118 ("re-scan" in ST209), the process returns to ST201 and the checkout counter 1 performs the item recognition operation again.

When the user performs an operation for selecting an erroneously recognized item, specifically, operates the listed item box 115 for the erroneously recognized item ("select item" in ST209), the screen transitions to the change/delete selection screen (see FIG. 10A) (ST210).

Then, when the user operates the "change" button 154 on the change/delete selection screen (see FIG. 10A) ("change" in ST211), the screen transitions to the item category selection screen (see FIG. 10B). Furthermore, when the user operates the "delete" button 153 ("delete" in ST211), the screen transitions to the delete confirmation screen (see FIG. 11B). Then, when the user performs necessary operations, the screen transitions to an item list confirmation screen (see FIGS. 11A to 11D) (ST213). The item list confirmation screens reflect detailed data that has been entered and results of operations that have been done.

When the user selects cancellation of the purchase, specifically operates the "cancel" button 119 ("cancel" in ST211), the screen transitions to the cancel screen (see FIG. 8D) (ST212). When the user performs an operation for selecting checkout, specifically operates the "checkout" button 117 ("checkout" in ST211), the process proceeds to face recognition, and the screen transitions to the face recognition screen (see FIG. 7A) (ST221). Also, when the user operates the "re-scan" button 118 ("re-scan" in ST211), the process returns to ST201 and the checkout counter performs the item recognition operation again.

When displaying the face recognition screen (see FIG. 7A) (ST221), the checkout counter extracts a face image from an image captured by the face recognition camera 46 and transmits a request for face recognition, the request including the face image, to the face recognition server 15 (ST222). In response to the request from the checkout counter, the face recognition server 15 performs the face recognition operation based on the face image transmitted from the checkout counter 1 and transmits a face recognition response, the response including a face recognition result, to the checkout counter 1.

When the checkout counter 1 receives the face recognition response transmitted from the face recognition server 15 (ST223), and the face recognition response includes a face recognition result indicating that the face recognition is successfully done (Yes in ST224), the checkout counter 1 determines whether or not items to be purchased include an age-restricted item. When determining that there is an age-restricted item, the checkout counter 1 performs an age verification operation on the user identified by the face recognition to determine whether or not the user is subject to age restrictions on purchase of age-restricted items; that is, whether or not the user is underage (ST225). In operation for detection of an age-restricted item, the checkout counter 1 determines that there is an age-restricted item based on the age-restriction flag for the item. In operation for age verification, the checkout counter 1 determines whether or not the user is underage based on the age information (date of birth or current age) included in the face recognition.

When determining that the user identified by the face recognition is not underage; that is, the user is not subject to age restrictions on purchase of age-restricted items (e.g., the user's age is an adult age) (No in ST225), the process proceeds to password recognition, and the checkout counter displays the password recognition screen (see FIG. 8A) (ST226).

Then, when the user enters the user's password (passcode) on the password recognition screen (see FIG. 8A), the checkout counter transmits a request for password recognition to the user management server 13 (ST227). In response to the request from the checkout counter, the user management server 13 performs the password recognition operation based on the password information transmitted from the checkout counter 1 and transmits a password recognition response, the response including a password recognition result, to the checkout counter 1.

The checkout counter 1 receives the password recognition response including a password recognition result transmitted from the user management server 13 (ST228). When determining that the password recognition result indicates that the password recognition is successfully done (Yes in ST229), the checkout counter 1 transmits a request for payment to the payment server 12 via the user management server 13 (ST230). When receiving the request for payment, the payment server 12 performs a payment operation and transmits a payment response to the checkout counter 1 via the user management server 13.

When receiving the payment response from the payment server 12 (ST231), the checkout counter 1 displays the payment completion screen (see FIG. 8C) (ST232). Then, the checkout counter 1 performs a receipt issuing operation (ST233), and transmits receipt information to the user terminal 11 via the user management server 13 (ST234). When receiving the receipt information, the user terminal 11 stores it in the storage device 62 of the user terminal 11.

When the face recognition result indicates that the face recognition has failed (No in ST224), the checkout counter 1 displays the user ID selection screen (see FIG. 9A).

Next, when the user performs the user ID selection operation, specifically operates the user ID button 142 on the user ID selection screen (see FIG. 9A) ("select user ID" in ST236), the process proceeds to password recognition and the checkout counter displays the password recognition screen (see FIG. 8A) (ST226). When the user performs a no-candidate operation, specifically operates the "no candidate" button 143 ("no candidate" in ST236), the checkout counter displays the error screen (see FIG. 9B) (ST237). When the user performs the cancel operation, specifically, operates the "cancel" button 119 ("cancel" in ST236), the screen transitions to the cancel screen (see FIG. 8D) (ST212).

When determining that the user is subject to age restrictions on purchase of age-restricted items; that is, the user is underage (Yes in ST225), the checkout counter displays the error screen (see FIG. 7D) (ST238).

Next, when the user performs operates a cancellation operation, specifically operates the "cancel" button 119 ("cancel" in ST239) on the error screen (see FIG. 7D), the screen transitions to the cancel screen (see FIG. 8D) (ST212). When the user performs a return operation, specifically, operates the "return" button 129 ("return" in ST239), the process returns to ST201. Then, the checkout counter performs the item detection operation (ST202), the item recognition operation (ST203), and the checkout operation (ST204), whereby the screen transitions to the unconfirmed item confirmation screen (see FIG. 6B). As a result, the user can remove the age-restricted item and re-perform the subsequent operations.

When the password recognition result indicates that the password recognition has failed (No in ST229), the checkout counter determines whether or not the password recognition operation has failed a predetermined number of times in succession (ST240). When the password recognition has not failed the predetermined number of times in succession (No in ST240), the process proceeds to password recognition again and the checkout counter displays the password recognition screen for re-entry (see FIG. 9C) (ST226). When the password recognition has failed the predetermined number of times in succession (Yes in ST240), the checkout counter displays the error screen (see FIG. 9D) (ST241).

In the present embodiment, two-factor authentication; that is, a combination of face recognition and password recognition is adopted for enhanced security, and thus, even when face recognition is successfully done, the system performs the password recognition operation. However, in other embodiments, the system may be configured to perform only face recognition for user authentication, without performing password recognition.

While specific embodiments of the present invention are described herein for illustrative purposes, the present invention is not limited to the specific embodiments. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

INDUSTRIAL APPLICABILITY

A checkout-payment device and a checkout-payment system according to the present invention configured to recognize an item to be purchased through object recognition and allow a user to operate a touch screen display for purchase of the item, can be made space-saving and easily installed at a small store while being configured to avoid interference with object recognition, and are useful as a checkout-payment device and a checkout-payment system for recognizing a merchandise item chosen by a user from those in a selling space and making checkout and payment for the merchandise item.

GLOSSARY

1 checkout counter (checkout-payment device)
15 face recognition server (server device)
37 table
41 item shooting camera (first camera)
45 touch screen display (display)
46 face recognition camera (second camera)
112 "confirm" button (operation interface)
117 "checkout" button (operation interface)

The invention claimed is:

1. A checkout-payment device for recognizing a merchandise item chosen by a user from those in a selling space and making checkout and payment for the merchandise item, the device comprising:
a table portion on which the user can place the merchandise item to purchase;
a touch screen display arranged opposite to the user across the table portion therebetween;
a camera device for capturing an image of the merchandise item on the table portion; and
a controller configured to perform an item recognition operation for recognizing the merchandise item to be purchased by the user based on the image of the merchandise item acquired by the camera device, and display an item recognition result on the touch screen display, the item recognition result being a result of the item recognition operation,
wherein the controller is configured to:
start a confirmation waiting time during which the controller continues to perform the item recognition operation, the confirmation waiting time including at least a time required for the user to perform an operation for confirmation of the item recognition result; and
subsequently, transition to a state in which the controller accepts instructions for payment execution provided by the user.

2. The checkout-payment device according to claim 1, wherein the confirmation waiting time is a predetermined time, and wherein, when the confirmation waiting time has elapsed, the controller accepts the user's instructions for payment execution while displaying the item recognition result confirmed by the user on the touch screen display, followed by transitioning to a non-use state in which the controller does not allow the item recognition result to be reflected in operations for checkout and payment for the merchandise item.

3. The checkout-payment device according to claim 1, wherein the camera device comprises:
a first camera configured to capture the image of the merchandise item on the table portion; and
a second camera configured to capture a face image of the user,
wherein, upon receiving the user's instructions for payment execution, the controller performs operations for face recognition based on the face image of the user captured by the second camera.

4. The checkout-payment device according to claim 1, wherein the controller, using the touch screen display, displays the item recognition result which has not been confirmed, along with an operation interface which the user can operate to confirm the item recognition result.

5. The checkout-payment device according to claim 1, wherein, during the confirmation waiting time, the controller provides a visual guidance which urges the user to take the user's hands off the touch screen display.

6. The checkout-payment device according to claim 1, wherein the controller, using the touch screen display, displays the item recognition result which has been confirmed by the user, along with an operation interface which the user can operate to provide instructions for payment execution.

7. A checkout-payment system comprising:
the checkout-payment device according to claim 3; and
a server device connected to the checkout-payment device via a network,
wherein the server device is configured to perform the operations for face recognition based on the face image of the user captured by the second camera.

* * * * *